United States Patent
Kawagoe et al.

(10) Patent No.: US 11,590,805 B2
(45) Date of Patent: Feb. 28, 2023

(54) TIRE

(71) Applicant: Sumitomo Rubber Industries, Ltd., Kobe (JP)

(72) Inventors: Yoshifumi Kawagoe, Kobe (JP); Toshiki Horiguchi, Kobe (JP); Mari Mishima, Kobe (JP); Kotaro Tahara, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 198 days.

(21) Appl. No.: 17/065,193

(22) Filed: Oct. 7, 2020

(65) Prior Publication Data

US 2021/0101412 A1  Apr. 8, 2021

(30) Foreign Application Priority Data

Oct. 8, 2019 (JP) ............................. JP2019-185311
Oct. 8, 2019 (JP) ............................. JP2019-185312
Oct. 8, 2019 (JP) ............................. JP2019-185313
Oct. 8, 2019 (JP) ............................. JP2019-185314

(51) Int. Cl.
*B60C 11/03* (2006.01)
*B60C 11/12* (2006.01)
*B60C 11/13* (2006.01)

(52) U.S. Cl.
CPC ...... *B60C 11/0304* (2013.01); *B60C 11/1204* (2013.01); *B60C 11/1236* (2013.01); *B60C 11/1369* (2013.01); *B60C 2011/0374* (2013.01); *B60C 2011/1213* (2013.01)

(58) Field of Classification Search
CPC ............. B60C 11/0304; B60C 11/1204; B60C 11/1236; B60C 11/1369; B60C 2011/0374; B60C 2011/1213; B60C 11/03; B60C 11/12
See application file for complete search history.

(56) References Cited

U.S. PATENT DOCUMENTS

2018/0162175 A1 * 6/2018 Sano .................... B60C 11/1384
2021/0260929 A1 * 8/2021 Tokunaga ........... B60C 11/0309

FOREIGN PATENT DOCUMENTS

| AT | 403561 | * | 3/1998 | ............. B60C 11/12 |
|----|--------|---|--------|---|
| DE | 10 2007 044 435 A1 | | 3/2009 | |
| EP | 1 529 659 A2 | | 5/2005 | |
| EP | 2 055 505 A1 | | 5/2009 | |
| JP | 2019-6318 A | | 1/2019 | |
| WO | 2009037056 | * | 3/2009 | ............. B60C 11/03 |

OTHER PUBLICATIONS

Extended European Search Report for European Application No. 20200695.3, dated Dec. 23, 2020.

* cited by examiner

*Primary Examiner* — Galen H Hauth
*Assistant Examiner* — Shibin Liang
(74) *Attorney, Agent, or Firm* — Birch, Stewart, Kolasch & Birch, LLP

(57) ABSTRACT

A tire has a tread portion 2. The first middle land region 11 is provided with bend grooves 15 each having a first end 15a and a second end 15b. The first end 15a is connected to the first shoulder circumferential groove 5. The second end 15b is connected to one of the bend grooves 15 next in one of two opposite circumferential directions. Each bend groove 15 has two bent portions 16 and 17 at which the groove is bent. The bent angle θ1 at the first bent portion 16 is greater than the bent angle θ2 at the second bent portion 17.

19 Claims, 14 Drawing Sheets

TIRE

TECHNICAL FIELD

The present invention relates to a tire.

BACKGROUND ART

In order to improve steering stability and snow performance on paved roads, a variety of tires in which grooves and sipes in the land regions is improved in the arrangement have been proposed. (see, e.g., patent document 1 below)
Patent Document 1: Japanese Patent Application Publication No. 2019-6318

SUMMARY OF THE INVENTION

Problems to be Solved by the Invention

In recent years, as automobile performance is improved, there is a demand for tires that provide better wet performance. on the other hand, depending on the arrangement of the grooves and sipes, steering stability and wear resistance may be deteriorated as the wet performance is improved.

In view of the problems described above, the present invention was made, and a primary objective of the present invention is to provide a tire capable of providing excellent wet performance while maintaining steering stability and wear resistance.

According to first aspect of the invention, a tire comprises a tread portion having a first tread edge and a second tread edge, and the tread portion is provided with a plurality of circumferential grooves disposed between the first tread edge and the second tread edge and extending continuously in the tire circumferential direction to axially divided the tread portion into a plurality of land regions,
wherein
the circumferential grooves include a first shoulder circumferential groove positioned on the most first tread edge side among the circumferential grooves, and a crown circumferential groove positioned adjacently to the first shoulder circumferential groove on the second tread edge side thereof,
the land regions include a first middle land region defined between the first shoulder circumferential groove and the crown circumferential groove,
the first middle land region is provided with a plurality of bend grooves each having a first end and a second end,
each of the first ends of the bend grooves is connected to the first shoulder circumferential groove,
each of the second ends of the bend grooves is connected to one of the bend grooves which is next in one tire circumferential direction,
each of the bend grooves has a first bent portion on the first end side and a second bent portion on the second end side, at which the bend groove is bent,
wherein
a bent angle $\theta 1$ at the first bent portion is greater than a bent angle $\theta 2$ at the second bent portion.

It is preferable that the bend grooves each comprise: a first portion extending from the first end to a bent point of the first bent portion; a second portion extending from the bent point of the first bent portion to a bent point of the second bent portion; and a third portion extending from the bent point of the second bent portion to the second end, and the second end is connected to the second portion of the next bend groove.

It is preferable that the plurality of land regions includes a first shoulder land region defined between the first shoulder circumferential groove and the first tread edge, and
the first shoulder land region is provided with a plurality of first shoulder lateral grooves each having a connected part with the first shoulder circumferential groove, and
extensions of the connected parts of the first shoulder lateral grooves which are extended toward the tire equator in parallel to the tire axial direction, overlap with the first ends of the bend grooves.

It is preferable that the first middle land region is provided with a plurality of auxiliary grooves including inner auxiliary grooves extending from the bend grooves toward the crown circumferential groove and terminated within the first middle land region to have terminal ends.

It is preferable that the inner auxiliary grooves include first inner auxiliary grooves and second inner auxiliary grooves, and
the terminal ends of the second inner auxiliary grooves are positioned on the first shoulder circumferential groove side of the terminal ends of the first inner auxiliary groove.

It is preferable that the first inner auxiliary grooves and the second inner auxiliary grooves are inclined in the same direction with respect to the tire axial direction, and
the inclination angle of the second inner auxiliary grooves with respect to the tire axial direction is greater than the inclination angle of the first inner auxiliary grooves with respect to the tire axial direction.

It is preferable that the first middle land region is provided with a plurality of auxiliary grooves including inner auxiliary grooves extending from the bend grooves toward the crown circumferential groove and terminated within the first middle land region to have terminal ends, and
outer auxiliary grooves extending from the bend grooves toward the first shoulder circumferential groove and terminated within the first middle land region to have terminal ends, and
ends of the outer auxiliary grooves at the bend grooves are, through the bend grooves, opposed in the tire axial direction to ends of the inner auxiliary grooves at the bend grooves.

It is preferable that each of the outer auxiliary grooves comprises
an axial groove segment extending in the tire axial direction from one of the bend grooves, and
a circumferential groove segment extending in the tire circumferential direction from the axial groove segment.

It is preferable that the first middle land region is provided with a plurality of auxiliary grooves including inner auxiliary grooves extending from the bend grooves toward the crown circumferential groove and terminated within the first middle land region to have terminal ends, and outer auxiliary grooves extending from the bend grooves toward the first shoulder circumferential groove and terminated within the first middle land region to have terminal ends,
the inner auxiliary grooves include first inner auxiliary grooves and second inner auxiliary grooves, and the terminal ends of the second inner auxiliary grooves are positioned on the first shoulder circumferential groove side of the terminal ends of the first inner auxiliary groove, and
ends of the outer auxiliary grooves at the bend grooves are, through the bend grooves, opposed in the tire axial direction to ends of the second inner auxiliary grooves at the bend grooves.

It is preferable that the first middle land region is provided with a plurality of sipes including inner disconnected sipes extending from the crown circumferential groove and terminated within the first middle land region without being connected to the bend grooves to have terminal ends.

It is preferable that the first middle land region is disposed across the tire equator, the inner disconnected sipes include first inner disconnected sipes and second inner disconnected sipes, and the terminal ends of the second inner disconnected sipes are positioned on the bend grooves' side of the terminal ends of the first inner disconnected sipes, the first inner disconnected sipes are terminated on the crown circumferential groove side of the tire equator, and the second inner disconnected sipes extend across the tire equator.

According to second aspect of the invention, a tire comprises a tread portion having a first tread edge and a second tread edge, the tread portion is provided with a plurality of circumferential grooves disposed between the first tread edge and the second tread edge and extending continuously in the tire circumferential direction to axially divided the tread portion into a plurality of land regions, wherein the circumferential grooves include a first shoulder circumferential groove positioned on the most first tread edge side among the circumferential grooves, and a crown circumferential groove positioned adjacently to the first shoulder circumferential groove on the second tread edge side thereof, the land regions include a first middle land region defined between the first shoulder circumferential groove and the crown circumferential groove, the first middle land region is provided with a plurality of bend grooves each having a first end and a second end, and a plurality of auxiliary grooves, each of the first ends of the bend grooves is connected to the first shoulder circumferential groove, the second ends of the bend grooves are respectively connected to the respective next bend grooves in the tire circumferential direction, and the auxiliary grooves include inner auxiliary grooves extending from the bend grooves toward the crown circumferential groove and terminated within the first middle land region to have terminal ends.

It is preferable that the groove widths of the inner auxiliary grooves are gradually decreased toward the crown circumferential groove.

It is preferable that the inner auxiliary grooves include first inner auxiliary grooves and second inner auxiliary grooves, and the terminal ends of the second inner auxiliary grooves are positioned on the first shoulder circumferential groove side of the terminal ends of the first inner auxiliary groove.

It is preferable that the first inner auxiliary grooves and the second inner auxiliary grooves are inclined in the same direction with respect to the tire axial direction, and the inclination angle of the second inner auxiliary grooves with respect to the tire axial direction is greater than the inclination angle of the first inner auxiliary grooves with respect to the tire axial direction.

It is preferable that the bend grooves each comprise a first bent portion on the first end side and a second bent portion on the second end side to which one of the first inner auxiliary grooves is connected.

It is preferable that the auxiliary grooves include outer auxiliary grooves extending from the bend-grooves toward the first shoulder circumferential groove and terminated within the first middle land region, and ends of the outer auxiliary grooves at the bend grooves are, through the bend grooves, opposed in the tire axial direction to ends of the second inner auxiliary grooves at the bend grooves.

According to third aspect of the invention, a tire comprises a tread portion having a first tread edge and a second tread edge, the tread portion is provided with a plurality of circumferential grooves disposed between the first tread edge and the second tread edge and extending continuously in the tire circumferential direction to axially divided the tread portion into a plurality of land regions, wherein the circumferential grooves include a first shoulder circumferential groove positioned on the most first tread edge side among the circumferential grooves, and a crown circumferential groove positioned adjacently to the first shoulder circumferential groove on the second tread edge side thereof, the land regions include a first middle land region defined between the first shoulder circumferential groove and the crown circumferential groove, the first middle land region is provided with a plurality of bend grooves each having a first end and a second end, and a plurality of auxiliary grooves, each of the first ends of the bend grooves is connected to the first shoulder circumferential groove, the second ends of the bend grooves are respectively connected to the respective next bend grooves in the tire circumferential direction, and the auxiliary grooves include inner auxiliary grooves extending from the bend grooves toward the crown circumferential groove and terminated within the first middle land region to have terminal ends, and outer auxiliary grooves extending from the bend grooves toward the first shoulder circumferential groove and terminated within the first middle land region to have terminal ends, ends of the outer auxiliary grooves at the bend grooves are, through the bend grooves, opposed in the tire axial direction to ends of the inner auxiliary grooves at the bend grooves.

It is preferable that each of the outer auxiliary grooves comprises an axial groove segment extending in the tire axial direction from one of the bend grooves, and a circumferential groove segment extending in the tire circumferential direction from the axial groove segment.

It is preferable that the length in the tire axial direction of the axial groove segment is greater than the length in the tire axial direction of the inner auxiliary grooves.

DESCRIPTION OF THE PREFERRED EMBODIMENTS

The present invention can be applied to pneumatic tires and non-pneumatic tires, for passenger cars, heavy duty vehicles, and the like, and suitably applied to pneumatic tires for passenger cars.

Taking a pneumatic tire for passenger cars as an example, an embodiment of the present invention will now be described in detail in conjunction with accompanying drawings.

Figure 1:
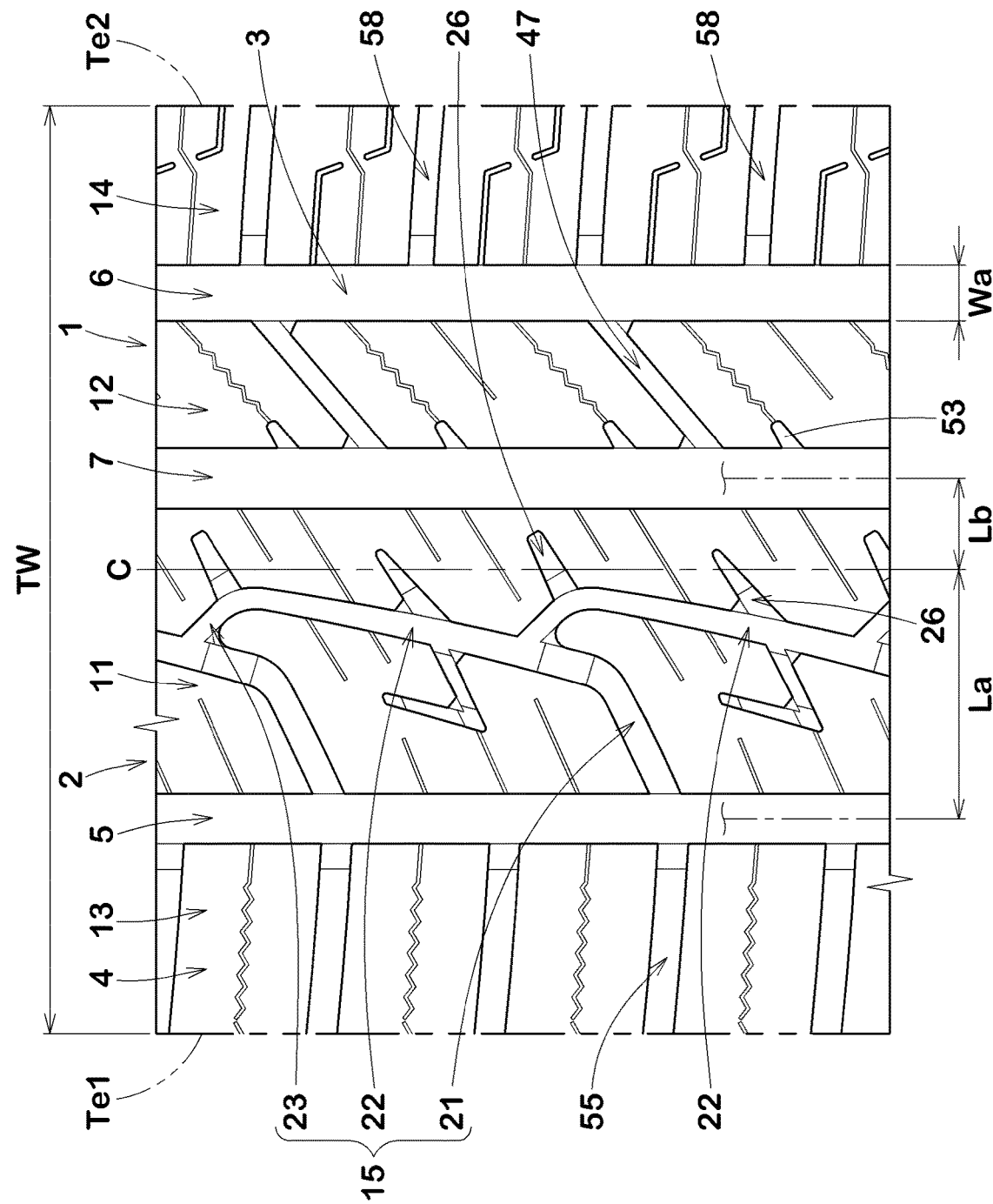
FIG. 1 is a developed partial view of the tread portion of a tire as an embodiment of the present invention.

FIG. 1 shows a part of the tread portion 2 of a pneumatic tire 1 as an embodiment of the invention.

As well known in the art, a pneumatic tire comprises a tread portion whose radially outer surface defines the tread surface, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

The tread portion 2 of the tire 1 in the present embodiment is provided with a tread pattern of left-right asymmetry (asymmetry about the tire equator).

Therefore, the mounting position of the tire 1 with respect to a vehicle is specified, in other words, which sidewall (not shown) of the tire is to be located on outside is specified. Accordingly, the tread portion 2 has a first tread edge Te1 to be positioned away from the center of the vehicle body and a second tread edge Te2 to be positioned close to the center of the vehicle body.

For example, a sidewall (not shown) of the tire to be located on outside when mounted on the vehicle is provided with an indication representing "outside", and a sidewall to be located on inside is provided with an indication representing "inside".

The tread edges Te (Te1 and Te2) are the axial outermost edges of the ground contacting patch of the tire which occurs under a normally loaded condition when the camber angle of the tire is zero.

The tread width TW is the width measured under a normal unloaded condition, as the axial distance between the tread edges Te determined as above.

In the case of a pneumatic tire, the normally loaded condition is such that the tire is mounted on a standard wheel rim and inflated to a standard pressure and loaded with a standard tire load.

In the case of a pneumatic tire, the normal unloaded condition is such that the tire is mounted on the standard wheel rim and inflate to the standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

As shown in FIG. 1, the tread portion 2 is provided with a plurality of circumferential grooves 3 extending continuously in the tire circumferential direction to axially divide the tread portion 2 into a plurality of land regions 4.

In the present embodiment, the tread portion 2 is divided into four land regions 4 by three circumferential grooves 3. However, the present invention is not limited to this arrangement, for example, the tread portion 2 may be divided into five land regions 4 by four circumferential grooves 3.

The circumferential grooves 3 in this example are a first shoulder circumferential groove 5, a second shoulder circumferential groove 6, and a crown circumferential groove 7. The first shoulder circumferential groove 5 is disposed between the first tread edge Te1 and the tire equator C, and is located on the most first-tread-edge side among the circumferential grooves 3.

The second shoulder circumferential groove 6 is disposed between the second tread edge Te2 and the tire equator C, and is located on the most second-tread-edge side among the circumferential grooves 3.

The crown circumferential groove 7 is disposed between the first shoulder circumferential groove 5 and the second shoulder circumferential groove 6.

The distance La in the tire axial direction from the tire equator C to the widthwise centerline of the first shoulder circumferential groove 5
is preferably set in a range from 0.20 to 0.35 times the tread width TW.

The distance La in the tire axial direction from the tire equator C to the widthwise centerline of the second shoulder circumferential groove 6
is preferably set in a range from 0.20 to 0.35 times the tread width TW.

The distance Lb in the tire axial direction from the tire equator C to the widthwise centerline of the crown circumferential groove 7 is preferably set in a range of less than 0.15 times the tread width TW.

In the present embodiment, the crown circumferential groove 7 is disposed between the tire equator C and the second tread edge Te2.

However, the crown circumferential groove 7 is not limited to such a position.

In the present embodiment, each of the circumferential grooves 3 is a straight groove extending parallel to the tire circumferential direction.

However, each of the circumferential grooves 3 may be a nonlinear groove such as wavy groove and zigzag groove.

The groove width Wa of each of the circumferential grooves 3 is at least 3.0 mm, and preferably not less than 4.0% and not more than 7.0% of the tread width TW for example. Here, the groove width is measured between the groove edges perpendicularly to the widthwise centerline of the groove.

The depth of each of the circumferential grooves 3 is preferably set in a range from 5 to 10 mm in the case of a passenger car tire.

The land regions 4 in this embodiment are a first middle land region 11, a second middle land region 12, a first shoulder land region 13, and a second shoulder land region 14.

The first middle land region 11 is defined between the first shoulder circumferential groove 5 and the crown circumferential groove 7.

The first middle land region 11 in the present embodiment extends across the tire equator C.

The second middle land region 12 is defined between the second shoulder circumferential groove 6 and the crown circumferential groove 7.

The first shoulder land region 13 is defined between the first shoulder circumferential groove 5 and the first tread edge Te1. The second shoulder land region 14 is defined between the second shoulder circumferential groove 6 and the second tread edge Te2.

As shown in FIG. 1, the first middle land region 11 has the largest axial width w1 among the four land regions 4. Thus, the first middle land region 11 is provided with higher rigidity which helps to improve the steering stability on pavement.

The axial width w1 of the first middle land region 11 is preferably set in a range from 0.25 to 0.35 times the tread width TW.

The first middle land region 11 is provided with a plurality of bend grooves 15 each having a first end 15a and a second end 15b.

The first end 15a of each of the bend grooves 15 is connected to the first shoulder circumferential groove 5.

The second end 15b of each of the bend grooves 15 is connected to one of the bend grooves 15 which is next thereto in one tire circumferential direction.

Thus, the bend grooves 15 together form a non-linear groove extending continuously in the tire circumferential direction, which helps to improve wet performance.

Further, when running on snow, such groove can form hard blocks of the packed snow and generate larger shear force to provide excellent snow performance.

Figure 3:
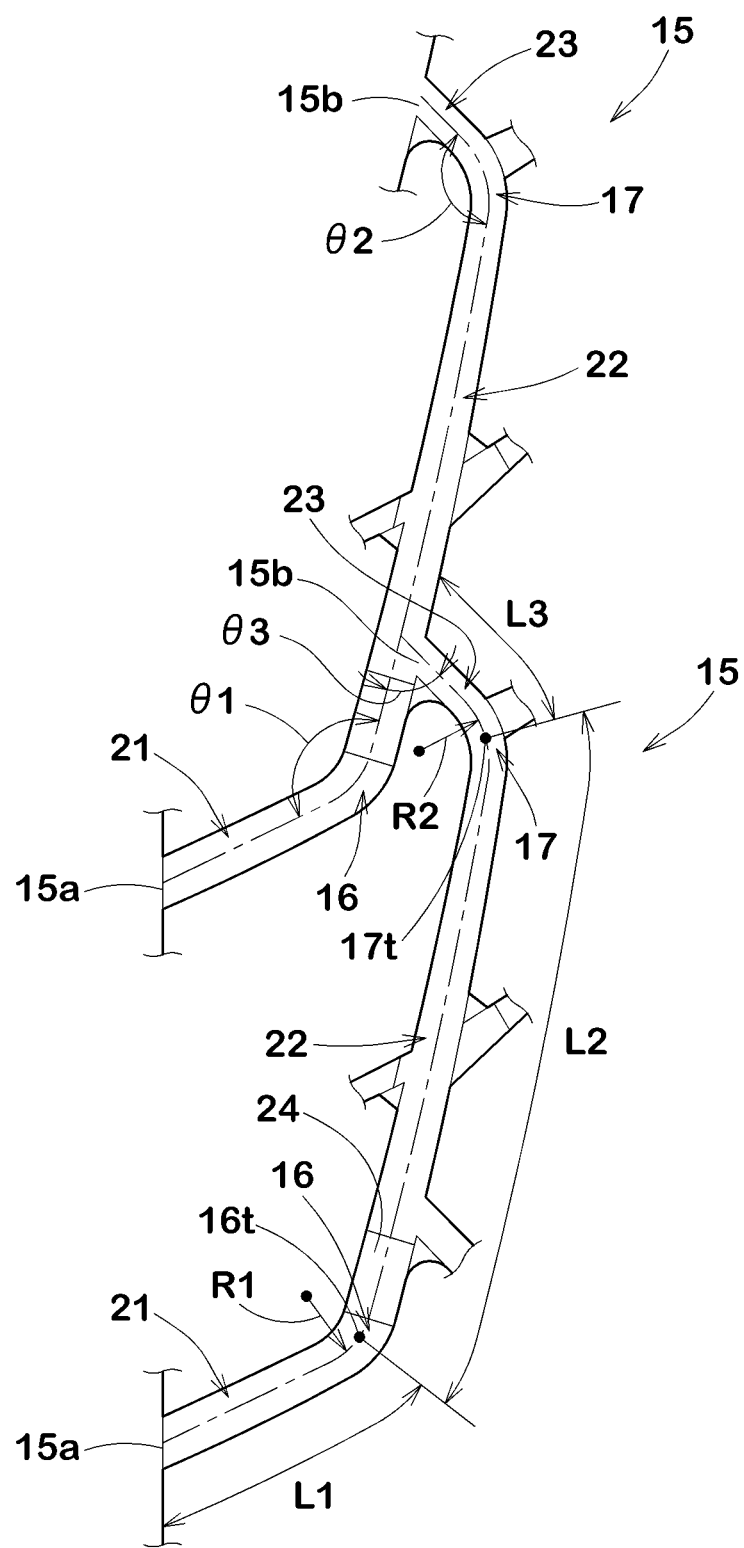
FIG. 3 is a view showing two bend grooves shown in FIGS. 1 and 2.

As shown in FIG. 3, the bend groove 15 has two bent portions, a first bent portion 16 on the first end 15a side and a second bent portion 17 on the second end 15b side. The bend groove 15 is made up of
a first portion 21 extending from the first end 15a to a bent point 16t of the first bent portion 16,
a second portion 22 from the bent point 16t of the first bent portion 16 to a bent point 17t of the second bent portion 17, and
a third portion 23 from the bent point 17t of the second bent portion 17 to the second end 15b.
Here, the bent point of a bent portion is defined as a point at which the curvature of the groove center line of the bent portion becomes its maximum. However, if a bent portion is curved at a constant radius of curvature, the bent point is defined as a midpoint of the length of the groove center line of the bent portion.

As shown in FIG. 3, the bent angle $\theta 1$ of the first bent portion 16 is greater than the bent angle $\theta 2$ of the second bent portion 17.

Thereby, water in the first bent portion 16 becomes easier to move as compared with the second bent portion 17.

Therefore, during running in wet conditions, the water in the bend groove 15 becomes easier to move from the second bent portion 17 toward the first bent portion 16, which makes it easier to drain the water toward the first shoulder circumferential groove 5.

In the present invention, since such a drainage mechanism is performed, wet performance can be improved while maintaining steering stability and wear resistance.

The bent angle $\theta 1$ is an obtuse angle, and preferably not less than 120 degrees, more preferably not less than 130 degrees, but preferably not more than 150 degrees, more preferably not more than 140 degrees.

The first bent portion 16 having such bent angle helps to improve wear resistance and wet performance in a well-balanced manner.

The bent angle $\theta 2$ is an obtuse angle, and preferably not less than 100 degrees, more preferably not less than 110 degrees, but preferably not more than 160 degrees, more preferably not more than 140 degrees from a similar reason as above.

It is preferable that the radius R2 of curvature of the second bent portion 17 is greater than the radius R1 of curvature of the first bent portion 16.

When running on snow, such second bent portion 17 can suppress clogging of the groove by snow, and makes it possible to continuously provide excellent snow performance.

The length L1 of the first portion 21 measured along the widthwise center line is set in a range from 0.30 to 0.60 times the width w1 in the tire axial direction of the first middle land region 11.

It is preferable that the first portion 21 has a constant groove width over the entire length.

The first portion 21 (widthwise center line) is inclined at an angle in a range from 20 to 30 degrees with respect to the tire axial direction.

Such first portion 21 is easy to guide the water in the groove toward the first shoulder circumferential groove 5 when running in wet conditions.

The length L2 of the second portion 22 measured along the widthwise center line is greater than the above-said length L1 of the first portion 21.

For example, the length L2 of the second portion 22 is set in a range from 2.5 to 3.5 times the length L1 of the first portion 21.

It is preferable that the groove width of the second portion 22 is gradually increased towards the first portion 21.

When running in wet conditions, the second portion 22 guides the water in the groove toward the first portion 21 by utilizing the tire rotation, and improves wet performance.

The second portion 22 is inclined in the same direction as the first portion 21 with respect to the tire axial direction. The inclination angle of the second portion 22 with respect to the tire axial direction is greater than
the inclination angle of the first portion 21 with respect to the tire axial direction.

For example, the inclination angle of the second portion 22 with respect to the tire axial direction is set in a range from 70 to 90 degrees.

Figure 4:
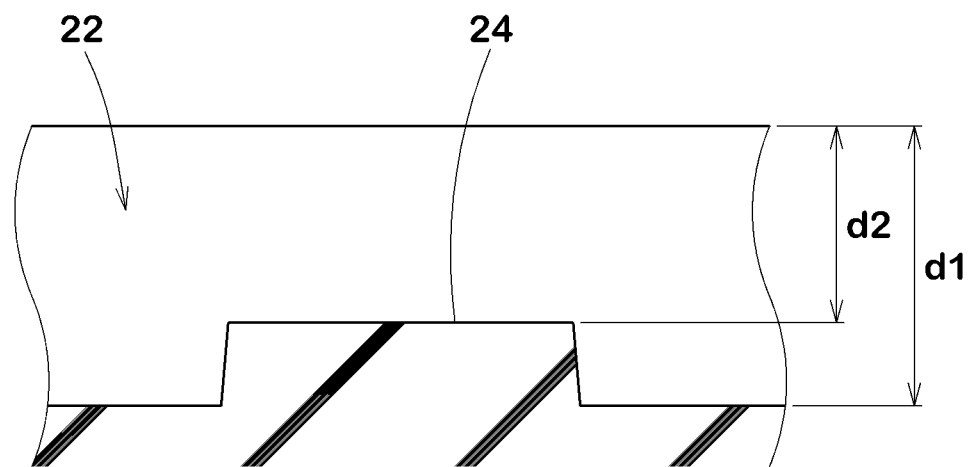
FIG. 4 is a cross-sectional view of a tie bar taken along line A-A in FIG. 2.

The second portion 22 is preferably provided with a tie bar 24 rising from the groove bottom as shown in FIG. 4. The depth d2 from the groove top (or the tread surface) to the radially outer surface of the tie bar 24 is preferably set in a range from 0.60 to 0.80 times the groove depth d1 of the second portion 22.

Such tie bar 24 helps to inhibit the second portion 22 from opening excessively when the second portion 22 comes into the ground contacting patch, thereby helping to improve steering stability and wear resistance.

Preferably, the tie bar 24 is located on the first portion 21 side of the midpoint of the length of the second portion 22 as shown in FIG. 3.

More preferably, the tie bar 24 is located at the end of the second portion 22 on the first bent portion 16 side.

The length L3 of the third portion 23 measured along the widthwise center line is less than the length L1 of the first portion 21, and less than the length L2 of the second portion 22. The length L3 of the third portion 23 is set in a range from 0.30 to 0.60 times the length L1 of the first portion 21, for example.

The third portion 23 in this example is inclined in the opposite direction to the first and second portions 21 and 22 with respect to the tire axial direction.

Preferably, the inclination angle of the third portion 23 with respect to the tire axial direction is greater than the inclination angle of the first portion 21 with respect to the tire axial direction, and less than the inclination angle of the second portion 22 with respect to the tire axial direction, and, for example, set in a range from 40 to 50 degrees.

Thereby, when running in wet conditions, water in the bend groove 15 is easily guided from the third portion 23 toward the first portion 21, and excellent wet performance is obtained.

The second ends 15b of the bend grooves 15 (or the ends of the third portions 23) are respectively connected to the bend grooves 15 which are respectively next in one circumferential direction of the tire.

Preferably, the second ends 15b are respectively connected to the second portions 22 of the next bend grooves 15. More preferably, the second end 15b is connected to the second portion 22 at a position on the first bent portion 16 side of the midpoint of the length of the second portion 22. In this embodiment, the tie bar 24 is disposed between the first bent portion 16 and the position at which the second end 15b is connected.

This further improves wear resistance and steering stability.

As shown in FIG. 3, between the third portion 23 of the bend groove 15 and the second portion 22 of the next bend groove 15, an angle θ3 (hereinafter referred to as the "intersecting angle θ3") is formed.

Preferably, the intersecting angle θ3 is less than the above-said bent angle θ1 and less than the above-said bent angle θ2. The intersecting angle θ3 is preferably not more than 90 degrees, more preferably not more than 80 degrees, but preferably not less than 45 degrees, more preferably not less than 65 degrees. Thereby, when running on snow, hard blocks of packed snow are formed at the junctions between the bend grooves 15, and snow performance is improved.

Figure 2:
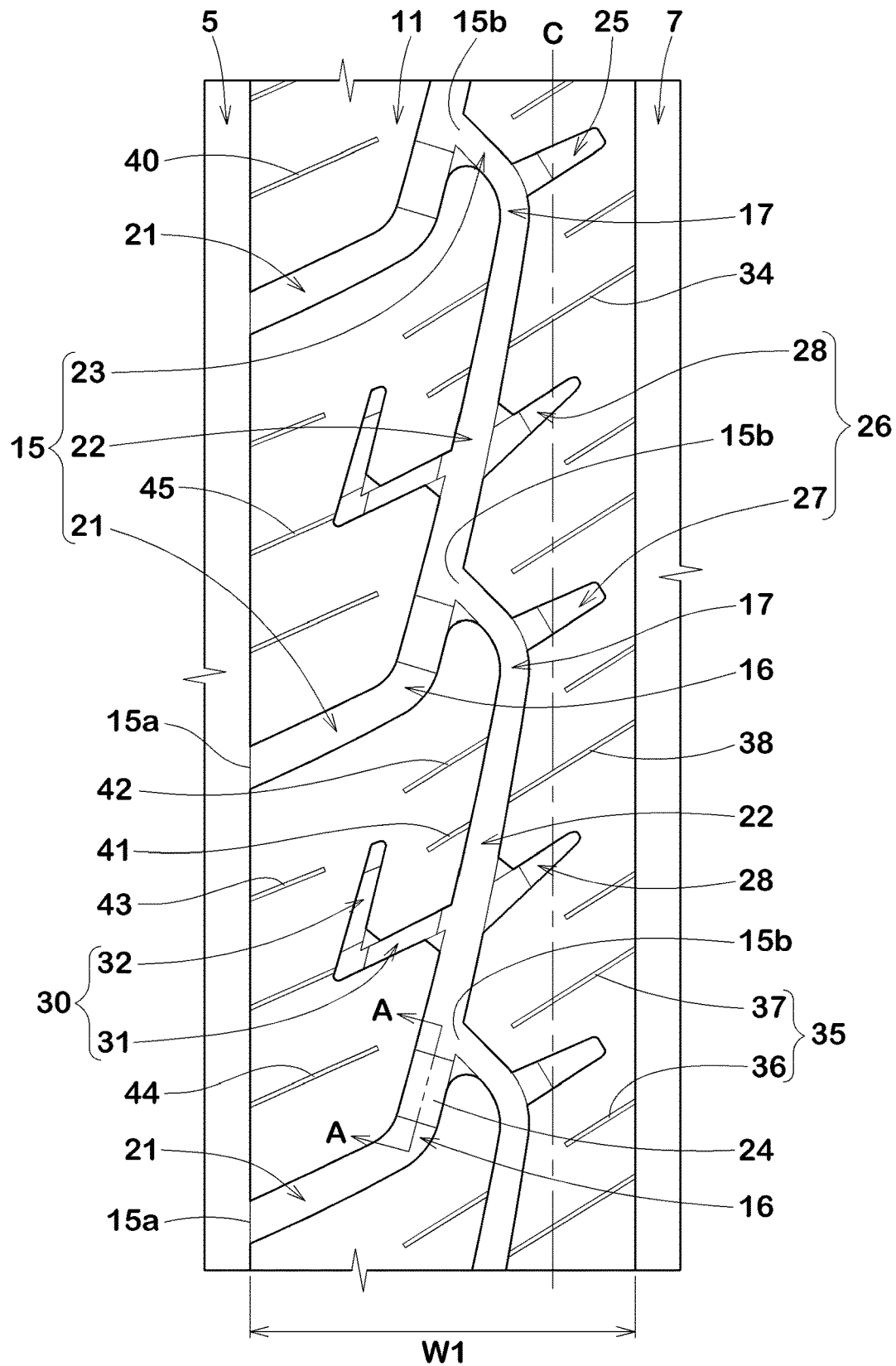
FIG. 2 is a partial top view of a first middle land region in FIG. 1.

In the present embodiment, the first middle land region 11 is provided with a plurality of auxiliary grooves 25 as shown in FIG. 2.

Figure 5:
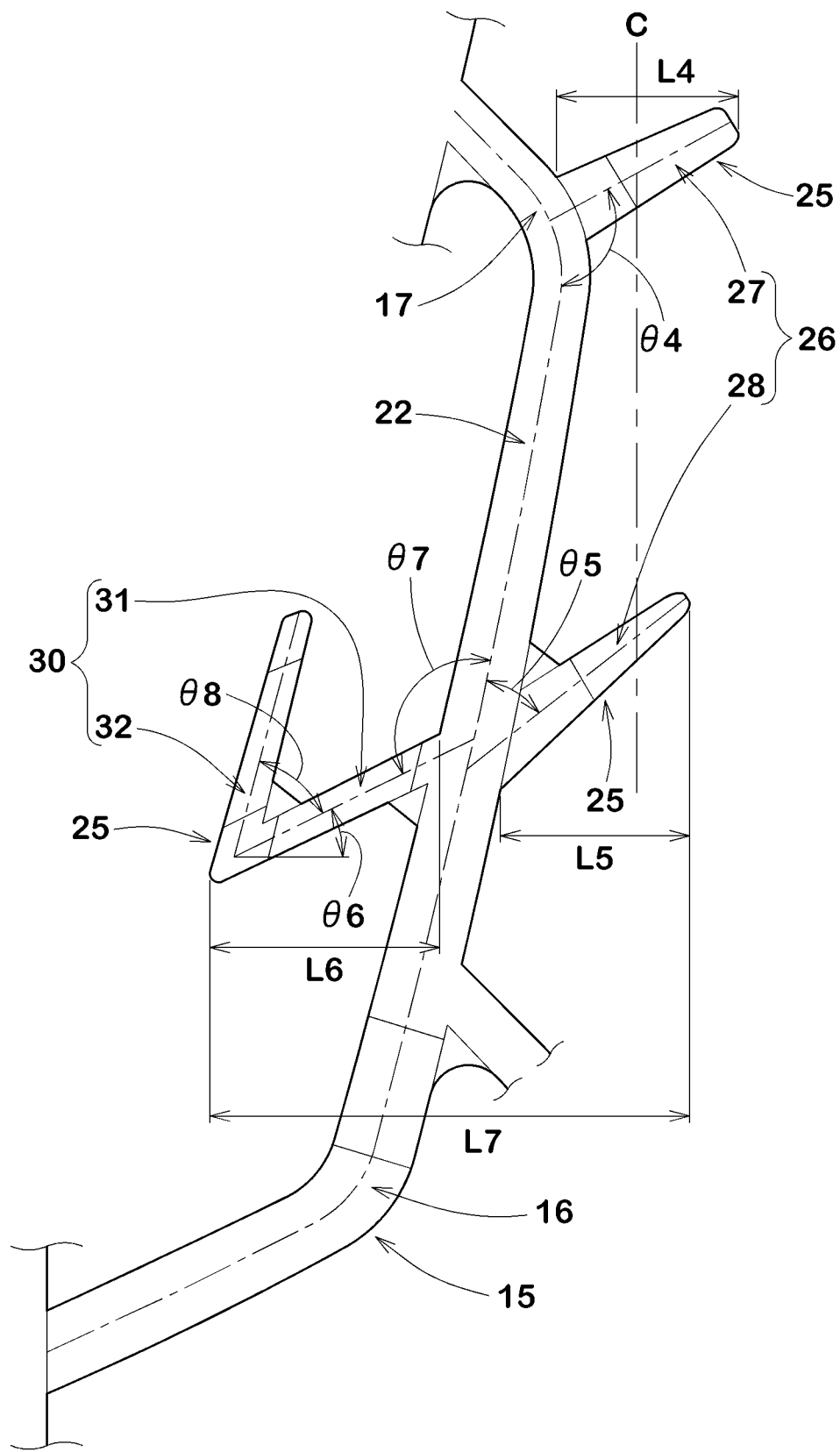
FIG. 5 is an enlarged view showing one bend groove and auxiliary grooves shown in FIGS. 1 and 2.

As shown in FIG. 5, the auxiliary grooves 25 include inner auxiliary grooves 26.

The inner auxiliary grooves 26 extend from the bend grooves 15 toward the crown circumferential groove 7, and terminate within the first middle land region 11.

The inner auxiliary grooves 26 works with the bend grooves 15 to form hard blocks of packed snow.

Since the inner auxiliary grooves 26 are terminated within the first middle land region 11, it can provide a land portion between the bend grooves 15 and the crown circumferential groove 7, which has relatively high circumferential stiffness, therefore, it is possible to maintain the steering stability on the pavement.

Preferably, the inner auxiliary grooves 26 extend across the tire equator C.

Preferably, the groove widths of the inner auxiliary grooves 26 are gradually decreased toward the crown circumferential groove 7.

Such inner auxiliary grooves 26 facilitate the formation of the hard snow blocks.

The maximum depth of the inner auxiliary grooves 26 is set in a range from 0.80 to 0.90 times the maximum depth of the bend grooves 15.

Preferably, the depths of the inner auxiliary grooves 26 are gradually decreased from the bend grooves 15 toward the terminal ends of the inner auxiliary grooves 26.

Such inner auxiliary grooves 26 help to improve the steering stability and snow performance in a well-balanced manner.

The inner auxiliary grooves 26 include first inner auxiliary grooves 27 and second inner auxiliary grooves 28. The terminal ends of the second inner auxiliary grooves 28 are positioned on the first shoulder circumferential groove 5 side of the terminal ends of the first inner auxiliary grooves 27. The first inner auxiliary grooves 27 in this example are respectively connected to the second bent portions 17 of the bend grooves 15.

The second inner auxiliary grooves 28 in this example are respectively connected to the second portions 22 of the bend grooves 15, i.e., between the first bent portions 16 and the second bent portions 17.

The length L4 in the tire axial direction of the first inner auxiliary grooves 27, and the length L5 in the tire axial direction of the second inner auxiliary grooves 28 are, for example, set in a range from 0.20 to 0.35 times the width w1 in the tire axial direction of the first middle land region 11.

The first inner auxiliary groove 27 and the second inner auxiliary groove 28 are inclined in the same direction with respect to the tire axial direction.

In this embodiment, the first inner auxiliary groove 27 and the second inner auxiliary groove 28 are inclined in the same direction as the first portions 21 of the bend grooves 15.

The first inner auxiliary groove 27 is inclined at an angle of from 20 to 50 degrees with respect to the tire axial direction.

The second inner auxiliary groove 28 is inclined at an angle of from 20 to 50 degrees with respect to the tire axial direction. Preferably, the angle of the second inner auxiliary groove 28 is greater than the angle of the first inner auxiliary groove 27, and the angle difference between the first inner auxiliary groove 27 and the second inner auxiliary groove 28 is, for example, not more than 15 degrees.

Such first inner auxiliary groove 27 and second inner auxiliary groove 28 help to control uneven wear of the first middle land region 11.

As shown in FIG. 5, the angle θ4 between the first inner auxiliary groove 27 and the second portion 22 of the bend groove 15 is preferably not less than 100 degrees, more preferably not less than 120 degrees, but preferably not more than 160 degrees, more preferably not more than 140 degrees.

The angle θ5 between the second inner auxiliary groove 28 and the second portion 22 of the bend groove 15 is preferably not less than 25 degrees, more preferably not less than 35 degrees, but preferably not more than 55 degrees, more preferably not more than 45 degrees.
Thereby, hard snow blocks are formed at the junctions between the bend grooves 15 and the inner auxiliary grooves 26, and superior snow performance is exerted.

The auxiliary grooves 25 in this embodiment include outer auxiliary grooves 30.
The outer auxiliary grooves 30 extend from the bend grooves 15 toward the first shoulder circumferential groove 5, and are terminated within the first middle land region 11. Such outer auxiliary grooves 30 can provide a portion within the first middle land region 11, which portion has relatively high circumferential stiffness.
This can improve snow performance while maintaining steering stability on pavement.

The outer auxiliary grooves 30 in this example are respectively connected to the second portions 22 of the bend grooves 15.
Preferably, the open end of the outer auxiliary groove 30 which opened to the bend groove 15, and the open end of the inner auxiliary groove 26 (which is the second inner auxiliary groove 28 in this example) which is opened to the same bend groove 15, are opposed to each other in the tire axial direction.
Such inner auxiliary groove 26 and outer auxiliary groove 30 can form a hard snow block at the junctions with the bend groove 15, which can further enhance the performance on snow.
Here, the two open ends being opposed to each other in the tire axial direction means that
the circumferential extents of the respective two ends are at least partially overlapped with each other in the tire circumferential direction.
Thus, the open end of the outer auxiliary groove 30 overlaps, in the tire circumferential direction, with the open end of the inner auxiliary groove 26.

The outer auxiliary groove 30 is made up of an axial groove segment 31 extending axially from the bend groove 15, and a circumferential groove segment 32 extending in the tire circumferential direction from the axial groove segment 31. such outer auxiliary grooves 30 help to improve the cornering performance on snowy roads.

The inner auxiliary groove 26 and the axial groove segment 31 are inclined in the same direction with respect to the tire axial direction.
Preferably, the inclination angle θ6 of the axial groove segment 31 with respect to the tire axial direction is less than the angle of the inner auxiliary groove 26 with respect to the tire axial direction.
The inclination angle θ6 of the axial groove segment 31 is, for example, 20 to 30 degrees.
The angle θ7 between the axial groove segment 31 and the second portion 22 of the bend groove 15 is, for example, 120-140 degrees.
Such lateral groove segments 31 provide traction on the snow road together with the inner auxiliary grooves 26.

The length L6 in the tire axial direction of the axial groove segment 31 is, for example, set in a range from 0.25 to 0.35 times the width w1 in the tire axial direction of the first middle land region 11.
Preferably, the length L6 of the axial groove segment 31 is greater than the length in the tire axial direction of the inner auxiliary grooves 26.
Such axial groove segments 31 improve the steering stability and snow performance in a well-balanced manner.

The total length L7 in the tire axial direction of the axial groove segment 31 and the second inner auxiliary groove 28, (namely, the length in the tire axial direction from the end of the axial groove segment 31 to the end of the second inner auxiliary groove 28), is set in a range from 0.60 to 0.70 times the width w1 in the tire axial direction of the first middle land region 11.

The circumferential groove segment 32 is inclined with respect to the tire axial direction in the same direction as the axial groove segments 31.
Thereby, the angle θ8 between the axial groove segment 31 and the circumferential groove segment 32 is an acute angle, e.g., 40 to 55 degrees.
The circumferential groove segment 32 in this example extends substantially parallel to the second portion 22 of the bend groove 15.
The angular difference between the circumferential groove segment 32 and the second portion 22 is less than 5 degrees. Such circumferential groove segments 32 improve the cornering performance on snow roads while maintaining wear resistance.

The maximum depth of the outer auxiliary groove 30 is set in a range from 0.80 to 0.90 times the maximum depth of the bend groove 15.
Preferably, the outer auxiliary groove 30 is gradually decreased in depth from the bend groove 15 to the terminal end of the circumferential groove segment 32.
Such outer auxiliary grooves 30 help to maintain steering stability and wear resistance.

As shown in FIG. 2, the first middle land region 11 in this example is provided with a plurality of sipes 34.
The term "sipe" means a narrow groove having a width not more than 1.5 mm inclusive of a cut having no substantial width.
The sipes 34 in this example include inner disconnected sipes 35.
The inner disconnected sipes 35 extend from the crown circumferential groove 7 and are terminated within the first middle land region 11 without connected to the bend grooves 15. The inner disconnected sipes 35 provide frictional forces by their edges, and
further enhance the snow performance on snowy roads covered with tightly compacted and relatively hard snow.
Since the inner disconnected sipes 35 are terminated within the first middle land region 11, the inner disconnected sipes 35 are able to provide a portion between the bend grooves 15 and the crown circumferential grooves 7, which portion has relatively high circumferential stiffness. Thus, it is possible to maintain steering stability on the pavement.

The inner disconnected sipes 35 in this example are inclined with respect to the tire axial direction.
The inner disconnected sipes 35 in this example are inclined in the same direction as the inner auxiliary grooves 26 with respect to the tire axial direction.
The inner disconnected sipes 35 include first inner disconnected sipes 36 and second inner disconnected sipes 37. The terminal ends of the first inner disconnected sipes 36 are positioned on the crown circumferential groove 7 side of the tire equator C.
The second inner disconnected sipes 37 extend across the tire equator C, and their terminal ends are positioned on the bend groove 15 side of the tire equator C.
Such first inner disconnected sipes 36 and second inner disconnected sipes 37 provide an excellent edge effect while maintaining wear resistance.

The length in the tire axial direction of the second inner disconnected sipes 37 is, for example, set in a range from 1.5 to 2.5 times the length in the tire axial direction of the first inner disconnected sipes 36.

The first inner disconnected sipes 36 and the second inner disconnected sipes 37 in this example are inclined at an angle of from 30 to 40 degrees with respect to the tire axial direction.

The first inner disconnected sipes 36 and the second inner disconnected sipes 37 extend parallel to each other.

Such first inner disconnected sipes 36 and the second inner disconnected sipes 37 help to reduce uneven wear of the first middle land region 11.

Further, the sipes 34 in this example include through sipes 38 extending from the crown circumferential groove 7 to the bend grooves 15.

The through sipes 38 in this example are inclined with respect to the tire axial direction in the same direction as the inner disconnected sipes 35.

Preferably, the through sipes 38 and the inner disconnected sipes 35 are arranged parallel to each other. such through sipes 38 help to further improve the snow performance.

Furthermore, the sipes 34 in this example include outer disconnected sipes 40.

The outer disconnected sipes 40 are disposed between the bend grooves 15 and the first shoulder circumferential groove 5, and each have one end terminated within the first middle land region 11.

With respect to the tire axial direction, the outer disconnected sipes 40 in this example are inclined in the same direction as the inner disconnected sipes 35.

The angles of the outer disconnected sipes 40 with respect to the tire axial direction are set in a range from 30 to 40 degrees for example.

The outer disconnected sipes 40 in this example include first outer disconnected sipes 41 and second outer disconnected sipes 42, each extending from one of the bend grooves 15 and terminated within the first middle land region 11 to have a terminal end as the above-said one end. The terminal ends of the second outer disconnected sipes 42 are positioned on the first shoulder circumferential groove 5 side of the terminal ends of the first outer disconnected sipes 41. The length in the tire axial direction of the second outer disconnected sipes 42 is less than the length in the tire axial direction of the axial groove segments 31 of the outer auxiliary grooves 30.

Such first outer disconnected sipes 41 and second outer disconnected sipes 42 help to improve steering stability and snow performance in a well-balanced manner.

The outer disconnected sipes 40 in this example further include third outer disconnected sipes 43 and fourth outer disconnected sipes 44, each extending from the first shoulder circumferential groove 5 and terminated within the first middle land region 11 to have a terminal end as the above-said one end. The terminal ends of the fourth outer disconnected sipes 44 are positioned on the bend groove 15 side of the terminal ends of the third outer disconnected sipes 43. The length in the tire axial direction of the fourth outer disconnected sipes 44 is the longest among the outer disconnected sipes 40.

Furthermore, the sipes 34 in this example include connected sipes 45 extending from the first shoulder circumferential groove 5 to the outer auxiliary grooves 30. such connected sipes 45 help to prevent snow from clogging the outer auxiliary groove 30 and provide excellent snow performance over the long term.

Figure 6:
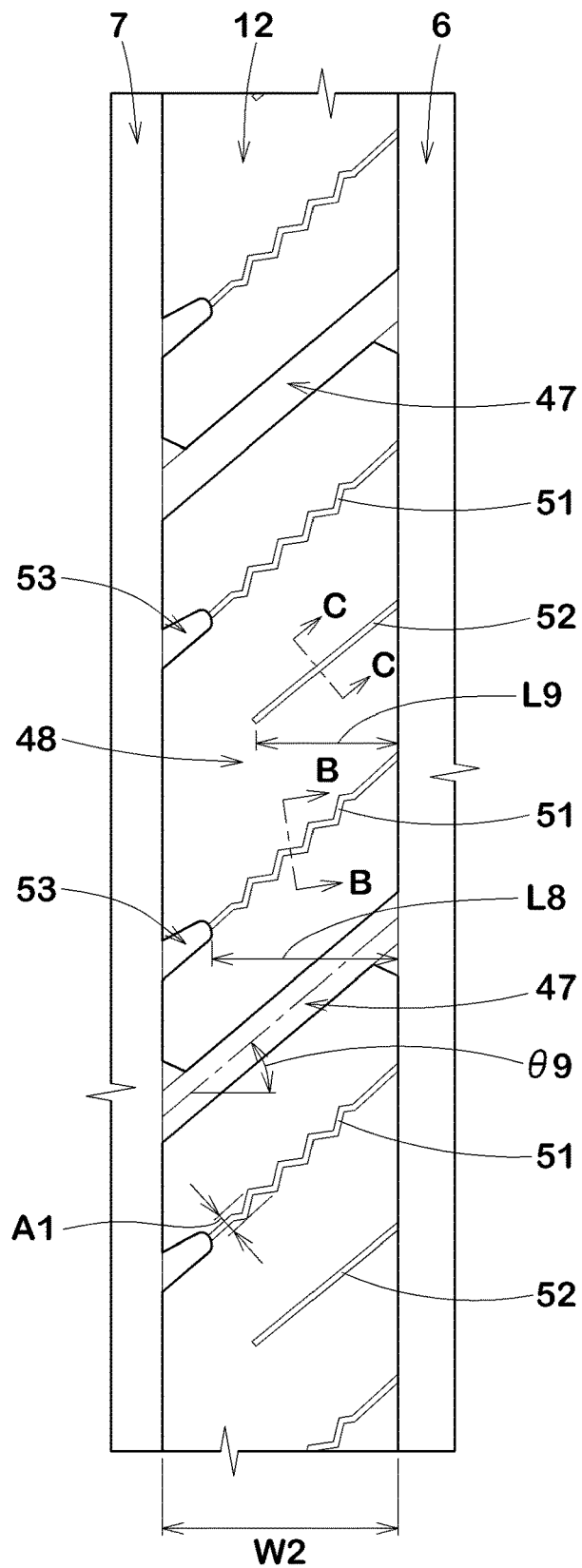
FIG. 6 shows a partial top view of a second middle land region in FIG. 1.

As shown in FIG. 6, the width w2 in the tire axial direction of the second middle land region 12 is, for example, set in a range from 0.10 to 0.20 times the tread width TW.

The second middle land region 12 is provided with middle lateral grooves 47 extending across the entire width of the second middle land region 12, therefore the second middle land region 12 is circumferentially divided into a plurality of middle blocks 48.

The middle lateral grooves 47 are inclined at an angle θ9 of from 30 to 60 degrees with respect to the tire axial direction, for example.

The middle lateral grooves 47 are however, not limited to such arrangement.

Each of the middle blocks 48 is provided with two first middle sipes 51 extending from the second shoulder circumferential groove 6, and a second middle sipe 52 disposed between the two first middle sipes 51.

In the top view of the middle block 48, the two first middle sipes 51 in this example each extend in a zigzag shape.

In the top view of the middle block 48, the second middle sipe 52 in this example extends in a straight shape.

Such sipes 51 and 52 provide frictional forces by their edges, which help to improve the snow performance.

Figure 7:
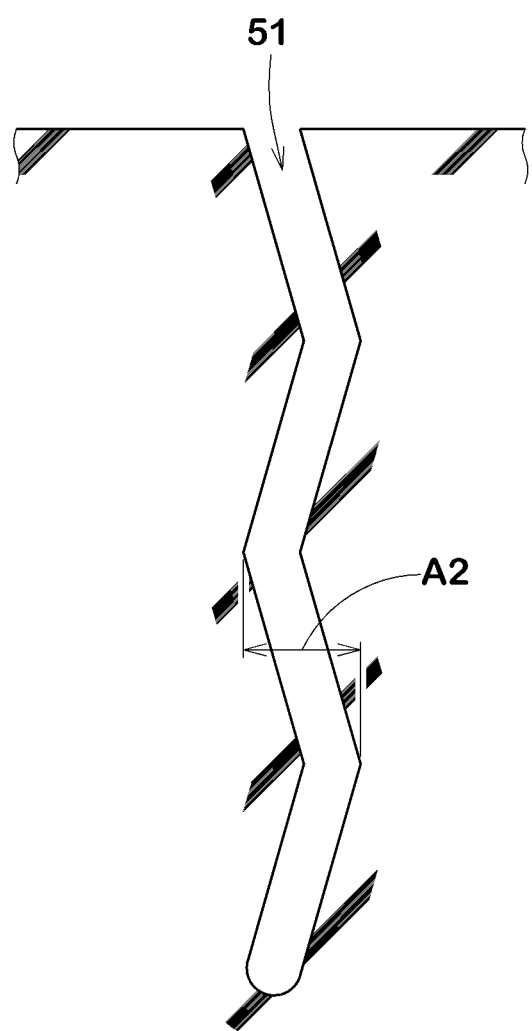
FIG. 7 is a cross-sectional view of a first middle sipe taken along line B-B of FIG. 6.

The first middle sipe 51 in this example extends in a zigzag or wavy manner in its depth direction as shown in FIG. 7 which is a cross-sectional view of the first middle sipe 51 taken along line B-B of FIG. 6.

Such first middle sipes 51 help to increase the apparent rigidity of the middle blocks 48 by the mutual engagement of the opposed walls of the sipes during braking and applying driving force. This helps to maintain wear resistance.

Figure 8:
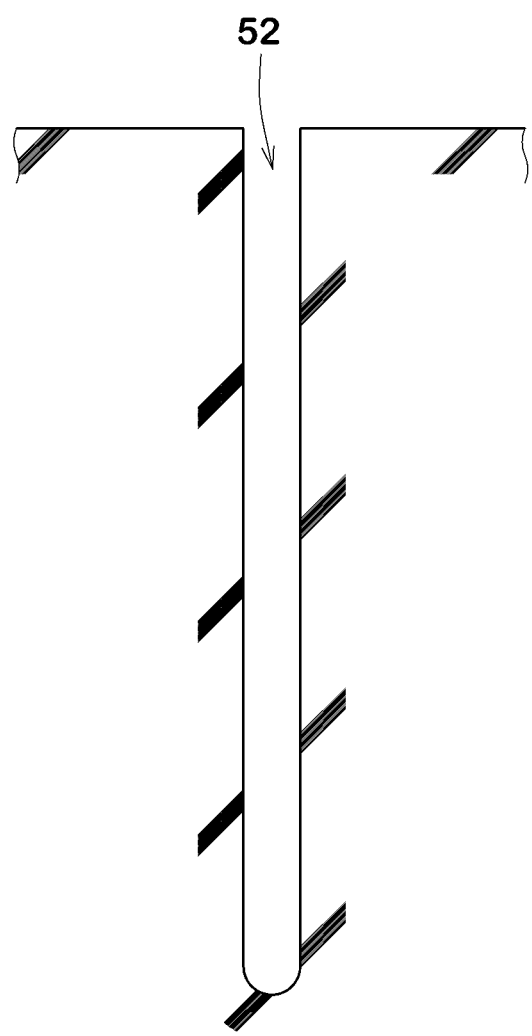
FIG. 8 is a cross-sectional view of a second middle sipe taken along line C-C of FIG. 6.

On the other hand, the second middle sipe 52 in this example extends straight in its depth direction as shown in FIG. 8 which is a cross-sectional view of the second middle sipe 52 taken along line C-C of FIG. 6.

Such second middle sipe 52 is easier to open at the ground contacting top surface of the middle blocks 48 during braking and applying driving force, as compared with the first middle sipe 51, therefore, the edge effect of the sipe to scratch the surface of the ground is more exerted.

Since the second middle sipe 52 in this example is extended from the second shoulder circumferential groove 6 and terminated within the second middle land region 12 to have a terminal end as shown in FIG. 6, the middle block 48 is provided with a part having a relatively high circumferential rigidity to maintain its wear resistance.

Figure 9:
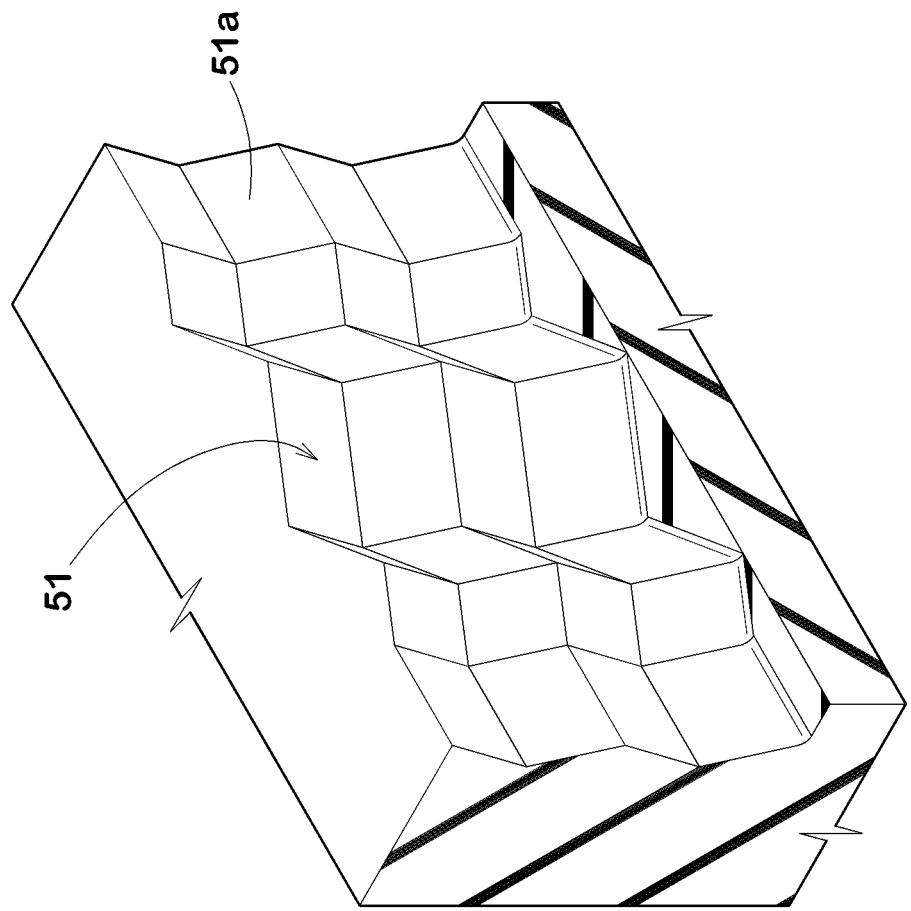
FIG. 9 is a perspective view showing a wall of the first middle sipe.

FIG. 9 shows one of the opposed walls 51a of the first middle sipe 51.

As shown, the first middle sipe 51 is a so-called 3D sipe which extends in a zigzag or wavy manner in both of the depth direction and the length direction of the sipe.

Such opposed walls 51a are engaged tightly with each other in the depth direction and the length direction, to increase the apparent rigidity of the middle block 48.

As shown in FIG. 6, in the ground contacting top surface of the middle blocks 48, the first middle sipe 51 has a zigzag configuration, and a peak-to-peak amplitude A1 thereof is in a range of from 1.0 to 3.5 mm, preferably 1.5 to 3.0 mm measured at the ground contacting top surface.

Thereby, the opening of the sipe is controlled, and molding defects during tire vulcanization is suppressed.

As shown in FIG. 7, in a cross section orthogonal to the length direction of the sipe, the first middle sipe 51 has a zigzag configuration, and a peak-to-peak amplitude A2 thereof is in a range from 0.5 to 2.5 mm, preferably 1.0 to 2.0 mm.

As shown in FIG. 6, in the ground contacting top surface of the middle blocks 48, the first middle sipes 51 and the second middle sipe 52 are inclined with respect to the tire axial direction.

In this embodiment, with respect to the tire axial direction, the first middle sipes 51 and the second middle sipe 52 are inclined in the same direction as the middle lateral grooves 47. The inclination angle of the first middle sipes 51 and the inclination angle of the second middle sipe 52 are set in a range from 30 to 60 degrees, preferably 35 to 50 degrees with respect to the tire axial direction.

The middle blocks 48 in this example are each provided with middle short grooves 53, each extending from the crown circumferential groove 7 and terminated within the middle block 48.

The middle short grooves 53 are respectively connected to the first middle sipes 51.

The first middle sipes 51 have a length L8 in the tire axial direction in a range from 0.70 to 0.90 times the width w2 in the tire axial direction of the second middle land region 12.

The terminal ends of the second middle sipes 52 are positioned on the crown circumferential groove 7 side of the center in the tire axial direction of the second middle land region 12.

The length L9 in the tire axial direction of the second middle sipe 52 is less than the length L8 in the tire axial direction of the first middle sipes 51.

The length L9 is in a range from 0.50 to 0.70 times the width w2 of the second middle land region 12.

Such second middle sipe 52 improves wear resistance and snow performance in a well-balanced manner.

Figure 10:
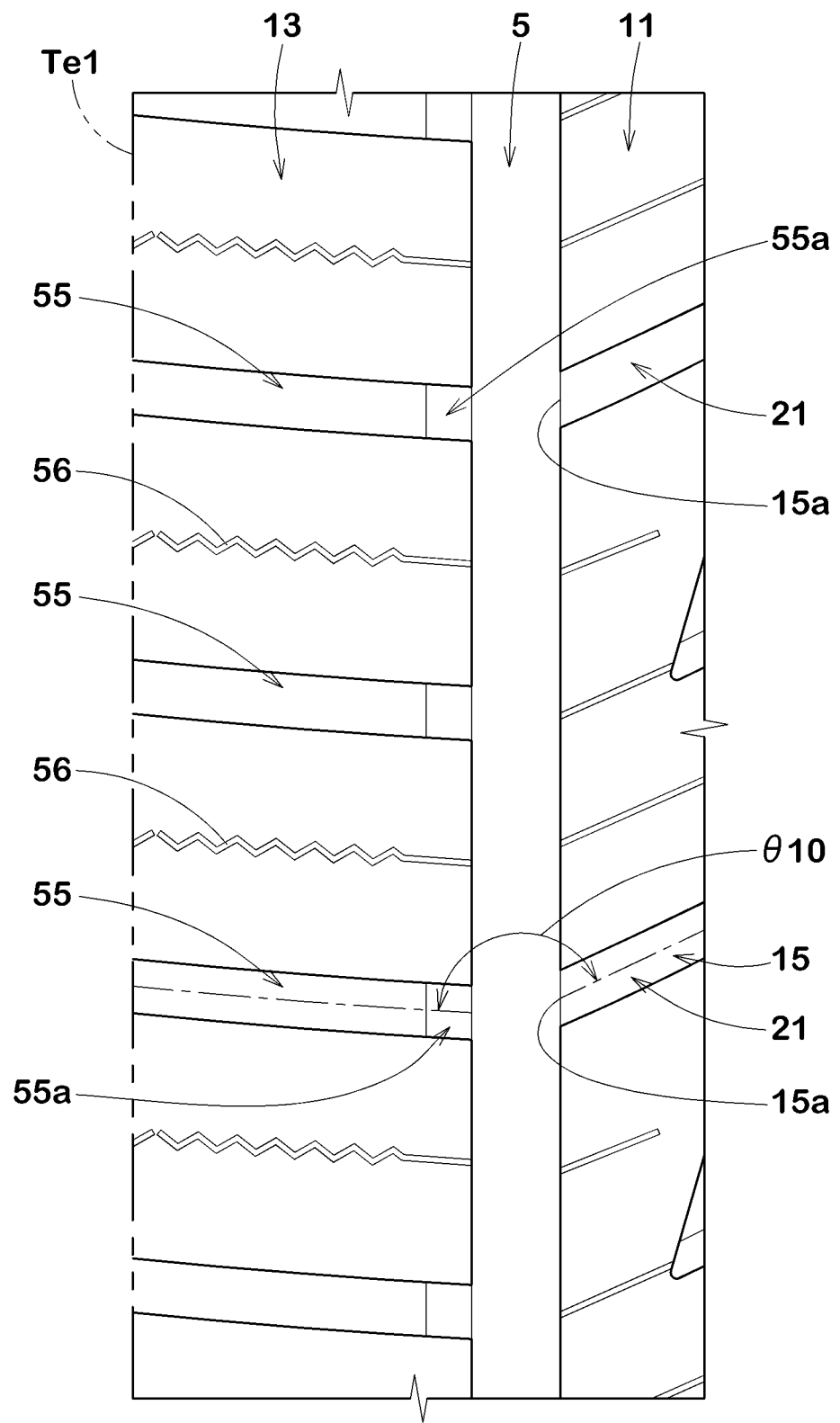
FIG. 10 is a partial top view of a first shoulder land region in FIG. 1.

As shown in FIG. 10, the first shoulder land region 13 is provided with first shoulder lateral grooves 55 extending from the first shoulder circumferential groove 5 to the first tread edge Te1, therefore, the first shoulder land region 13 is circumferentially divided into first shoulder blocks.

The first shoulder lateral grooves 55 each have an end portion 55a connected to the first shoulder circumferential groove 5.

As shown in FIG. 1, the first shoulder lateral grooves 55 in this example are inclined with respect to the tire axial direction in the opposite direction to the first portions 21 of the bend grooves 15.

The first shoulder lateral grooves 55 have an inclination angle of from 5 to 15 degrees with respect to the tire axial direction. such first shoulder lateral grooves 55 improve traction performance when running on snow.

When the above-said end portion 55a connected to the first shoulder circumferential groove 5, of at least one of the first shoulder lateral grooves 55, is extended toward the tire equator C in parallel with the tire axial direction, the extended end portion 55a preferably overlaps with the first end 15a of one of the bend grooves 15 as shown in FIG. 10. As a result, a hard snow block is formed at the end portion 55a, by the first shoulder circumferential groove 5, and the first portion 21 of one of the bend grooves 15 when running on snow, which provides excellent snow performance.

As shown in FIG. 10, the angle θ10 formed between the first shoulder lateral groove 55 and the first portion 21 of the bend groove 15 is preferably greater than the above-said bent angle θ1 of the first bent portion 16, and greater than the above-said bent angle θ2 of the second bent portion 17. The angle θ10 is preferably not less than 140 degrees, more preferably not less than 145 degrees, preferably not more than 165 degrees, more preferably not more than 155 degrees. This improves not only traction performance but also cornering performance when running on snow.

The first shoulder land region 13 in this example is further provided with shoulder sipes 56 extending in the tire axial direction in a zigzag manner.

The shoulder sipes 56 can enhance wet performance and snow performance while maintaining the rigidity of the first shoulder land region 13.

Figure 11:
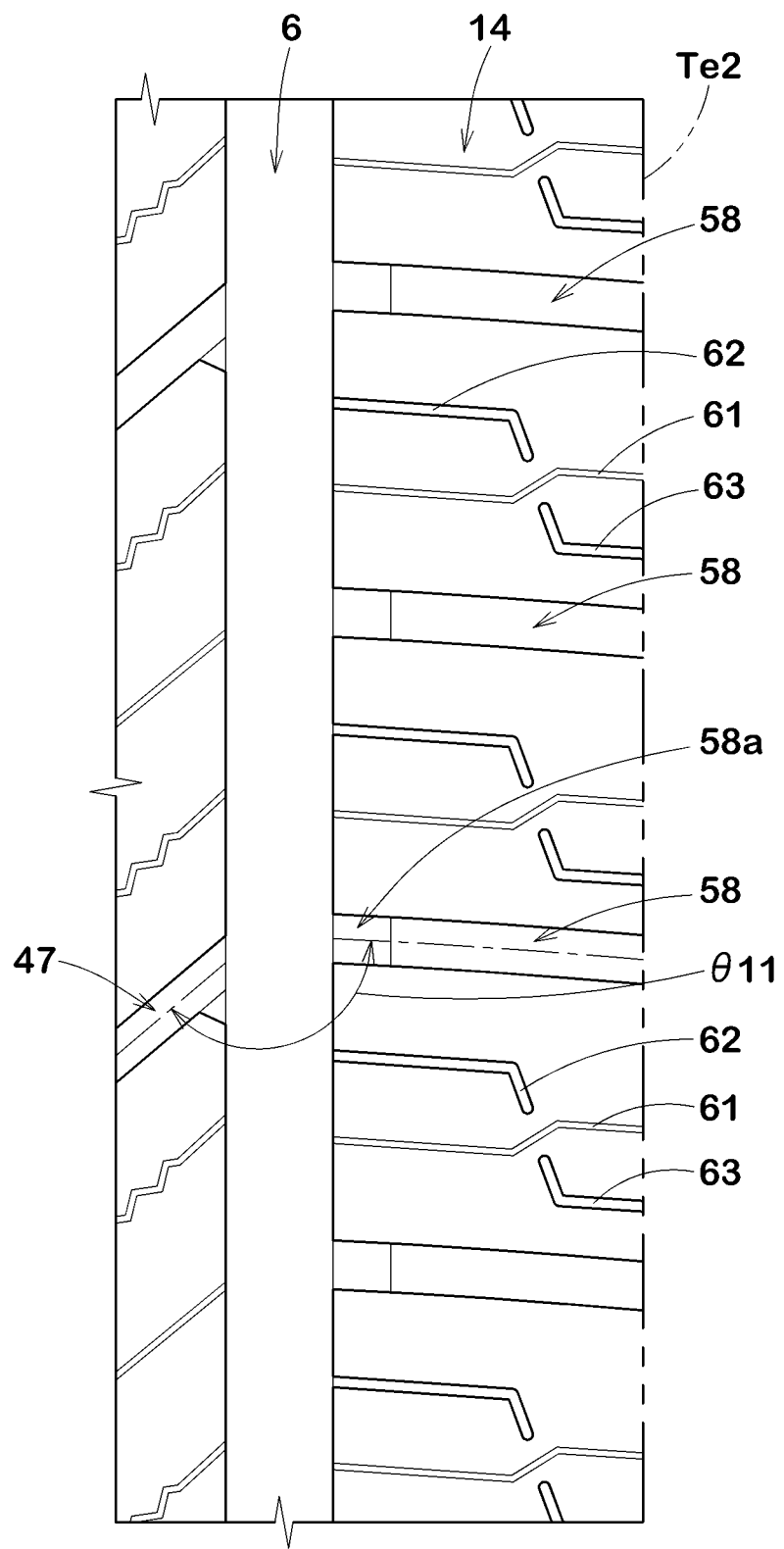
FIG. 11 is a partial top view of a second shoulder land region in FIG. 1.

FIG. 11 shows the second shoulder land region 14. As shown, the second shoulder land region 14 is provided with second shoulder lateral grooves 58 extending from the second shoulder circumferential groove 6 to the second tread edge Te2, therefore, the second shoulder land region 14 is circumferentially divided into second shoulder blocks.

The second shoulder lateral grooves 58 has an end portion 58a connected to the second shoulder circumferential groove 6.

When the end portion 58a of at least one of the second shoulder lateral grooves 58 is extended toward the tire equator in parallel with the tire axial direction, the extended end portion 58a overlaps with the end portion of the middle lateral groove 47 connected to the second shoulder circumferential groove 6. Such arrangement helps to enhance the snow performance.

The angle θ11 formed between the second shoulder lateral groove 58 and the middle lateral groove 47 is preferably less than the angle θ10 between the first shoulder lateral groove 55 and the first portion 21 of the bend groove 15. Specifically, the angle θ11 is set in a range from 130 to 150 degrees.

This makes it difficult for snow to clog the second shoulder circumferential groove 6, and excellent snow performance is exhibited.

The second shoulder land region 14 in this example is further provided with a first shoulder sipe 61, a second shoulder sipe 62 and a third shoulder sipe 63 on each of the second shoulder blocks.

The first shoulder sipe 61 extends from the second shoulder circumferential groove 6 to the second tread edge Te2.

The second shoulder sipe 62 extends from the second shoulder circumferential groove 6 and is terminated within the second shoulder land region 14.

The third shoulder sipe 63 extends from the second tread edge Te2 and is terminated within the second shoulder land region 14. Preferably, the terminal end of the second shoulder sipe 62 is opposed to the terminal end of the third shoulder sipe 63 through the first shoulder sipe 61.

Such second shoulder sipe 62 improves wet performance and snow performance.

While detailed description has been made of an especially preferable embodiment of the present invention, the present invention can be embodied in various forms without being limited to the illustrated embodiment.

WORKING EXAMPLES

Based on the tread pattern shown in FIG. 1, pneumatic tires of size 215/60R16 (rim size 16×6.5) were experimentally manufactured as working examples Ex.1 to Ex.17. Further, a comparative example Ref, which had the substantially same pattern as FIG. 1, excepting the bent angle θ1 and bent angle θ2 having the same value, was also experimentally manufactured.

And each test tire was tested for its wet performance, steering stability, wear resistance and snow performance. Test methods and common conditions are as follows.

Tire pressure: 240 kPa
Test vehicle: 2500cc front-wheel drive passenger car
Tire mounting position: all wheels <Wet Performance Test>
Wet performance when the test vehicle was running on a wet road was evaluated by the test driver.
The results are indicated in Tables 1-2 by an index based on comparative example Ref being 100, wherein the higher the number, the better the wet performance.

<Steering Stability Test>
Steering stability when the test vehicle was running on a paved road was evaluated by the test driver.
The results are indicated in Tables 1-2 by an index based on comparative example Ref being 100, wherein the higher the number, the better the steering stability.

<Wear Resistance Test>
After the test vehicle traveled for a predetermined distance, the crown circumferential groove was measured for the remaining groove depth.
The results are indicated in Tables 1-2 by an index based on comparative example Ref being 100, wherein the higher the number, the larger the remaining groove depth, namely, the better the wear resistance.

<Snow Performance Test>
Snow performance when the test vehicle was running on snowy roads was evaluated by the test driver.
The results are indicated in Tables 1-2 by an index based on comparative example Ref being 100, wherein the higher the number, the better the snow performance.

TABLE 1

| Tire | Ref | Ex. 1 | Ex. 2 | Ex. 3 | Ex. 4 | Ex. 5 | Ex. 6 | Ex. 7 | Ex. 8 |
|---|---|---|---|---|---|---|---|---|---|
| angle θ1 at first bent portion (deg.) | 125 | 135 | 120 | 130 | 140 | 150 | 135 | 135 | 135 |
| angle θ2 at second bent portion (deg.) | 125 | 114 | 114 | 114 | 114 | 114 | 100 | 110 | 120 |
| intersecting angle θ3 (deg.) | 55 | 73 | 73 | 73 | 73 | 73 | 73 | 73 | 73 |
| angle θ10 between first portion and first shoulder lateral groove (deg.) | 152 | 152 | 152 | 152 | 152 | 152 | 152 | 152 | 152 |
| wet performance | 100 | 105 | 102 | 105 | 105 | 106 | 106 | 105 | 104 |
| steering stability | 100 | 101 | 99 | 100 | 101 | 101 | 99 | 100 | 101 |
| wear resistance | 100 | 100 | 99 | 100 | 100 | 101 | 99 | 99 | 101 |
| snow performance | 100 | 104 | 105 | 104 | 104 | 102 | 103 | 104 | 104 |

TABLE 2

| Tire | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| angle θ1 at first bent portion (deg.) | 135 | 135 | 135 | 135 | 135 | 135 | 135 | 135 | 135 |
| angle θ2 at second bent portion (deg.) | 130 | 114 | 114 | 114 | 114 | 114 | 114 | 114 | 114 |
| intersecting angle θ3 (deg.) | 73 | 45 | 65 | 80 | 90 | 73 | 73 | 73 | 73 |
| angle θ10 between first portion and first shoulder lateral groove (deg.) | 152 | 152 | 152 | 152 | 152 | 140 | 145 | 155 | 165 |
| wet performance | 102 | 104 | 105 | 105 | 105 | 103 | 104 | 105 | 106 |
| steering stability | 102 | 98 | 101 | 101 | 101 | 99 | 100 | 101 | 100 |
| wear resistance | 101 | 97 | 100 | 100 | 100 | 98 | 100 | 100 | 99 |
| snow performance | 105 | 106 | 105 | 104 | 104 | 105 | 104 | 104 | 103 |

From the test results, it was confirmed that the working examples Ex.1 to Ex.17 were improved in the wet performance while maintaining steering stability and wear resistance. It was also confirmed that the working examples Ex.1 to Ex.17 demonstrated excellent snow performance.

Based on the tread pattern shown in FIG. 1, pneumatic tires of size 215/60R16 (rim size 16×6.5) were experimentally manufactured as working examples Ex.18 to Ex.26.
Further, a reference example Ref.1 having a first middle land region (a) shown in FIG. 12, was experimentally manufactured, wherein the first middle land region (a) was provided with auxiliary grooves (d) extending from the bend grooves (b) to a crown circumferential groove (c).
The reference example Ref.1 had the substantially same pattern as FIG. 1 except for the above.
Each test tire was tested for snow performance and steering stability.
The test methods and common conditions are described above.
The test results of the snow performance and steering stability are shown in Table 3 by an index based on Ref.1 being 100.

TABLE 3

Figure 12:
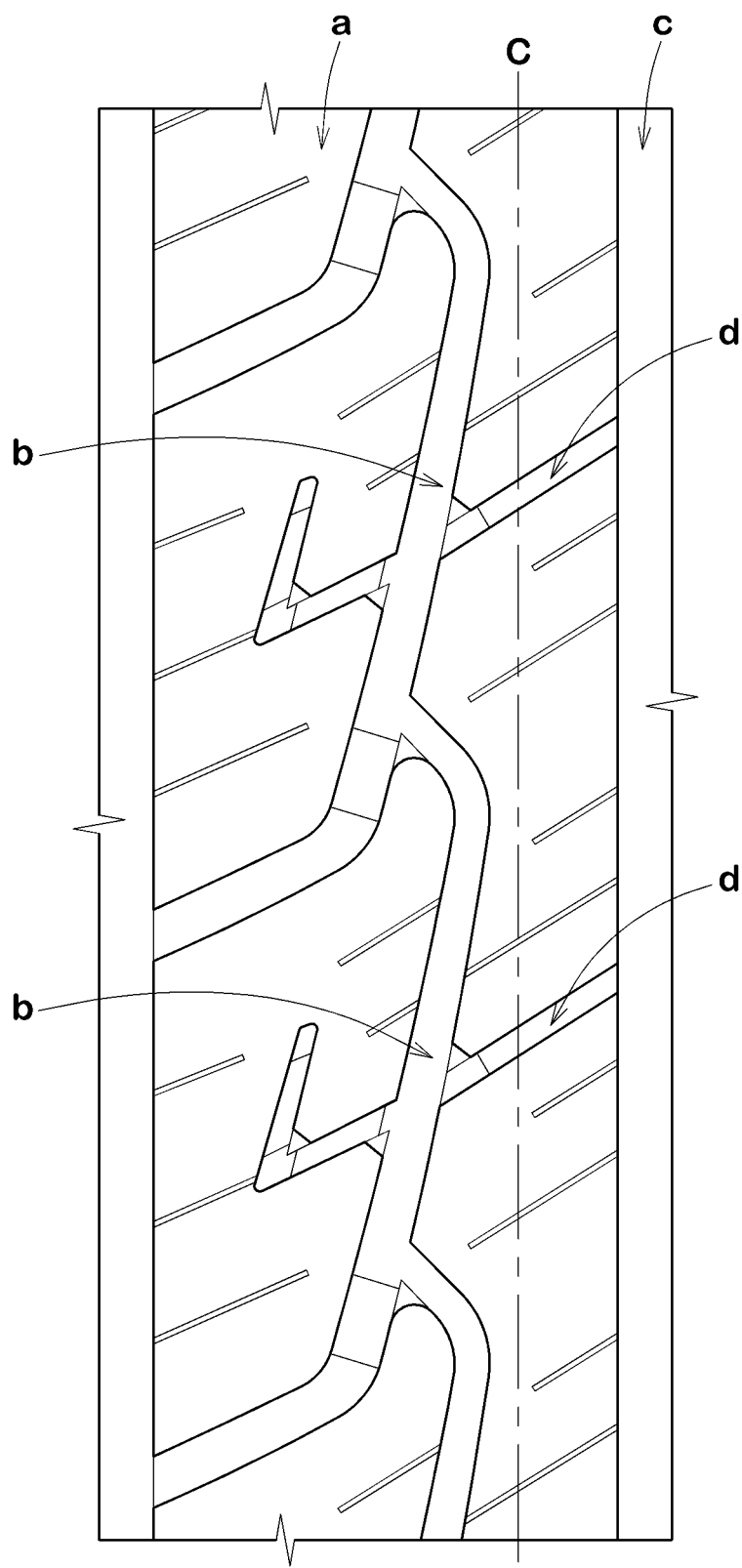
FIG. 12 shows a partial top view of a first middle land region of Reference example 1.

| Tire | Ref. 1 | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|---|
| first middle land region | FIG. 12 | FIG. 2 | FIG. 2 | FIG. 2 | FIG. 2 | FIG. 2 | FIG. 2 | FIG. 2 | FIG. 2 | FIG. 2 |
| Length of the first inner auxiliary groove L3/ Width of the first middle land region W1 | — | 0.25 | 0.15 | 0.20 | 0.23 | 0.28 | 0.25 | 0.25 | 0.25 | 0.25 |
| Length of the second inner auxiliary groove L4/ Width of the first middle land region W1 | — | 0.23 | 0.13 | 0.18 | 0.21 | 0.26 | 0.23 | 0.23 | 0.23 | 0.23 |
| Angle of the first inner auxiliary groove to the tire axial direction (deg.) | — | 27 | 27 | 27 | 27 | 27 | 17 | 22 | 32 | 37 |
| Angle of the second inner auxiliary groove to the tire axial direction (deg.) | — | 40 | 40 | 40 | 40 | 40 | 30 | 35 | 45 | 50 |
| snow performance | 100 | 104 | 102 | 103 | 104 | 104 | 104 | 104 | 103 | 102 |
| steering stability | 100 | 106 | 107 | 106 | 106 | 103 | 104 | 105 | 106 | 106 |

From the test results, it was confirmed that the tires of Examples 18 to 26 showed improved steering stability and snow performance.

Based on the tread pattern shown in FIG. 1, pneumatic tires of size 215/60R16 (rim size 16×6.5) were experimentally manufactured as working examples Ex.27 to Ex.33. Further, a reference example Ref.2 having a first middle land region (e) shown in FIG. 13 was experimentally manufactured. The reference example Ref.2 had a first middle land region (e) provided with bend grooves (f) and outer auxiliary grooves (g), but inner auxiliary grooves were not provided. The reference example Ref.2 had the substantially same pattern as FIG. 1 except for the above.

Each test tire was tested for snow performance and steering stability.

The test methods and common conditions are described above.

The test results are indicated in Tables 4-5 by an index based on Ref.2 being 100.

TABLE 4

Figure 13:
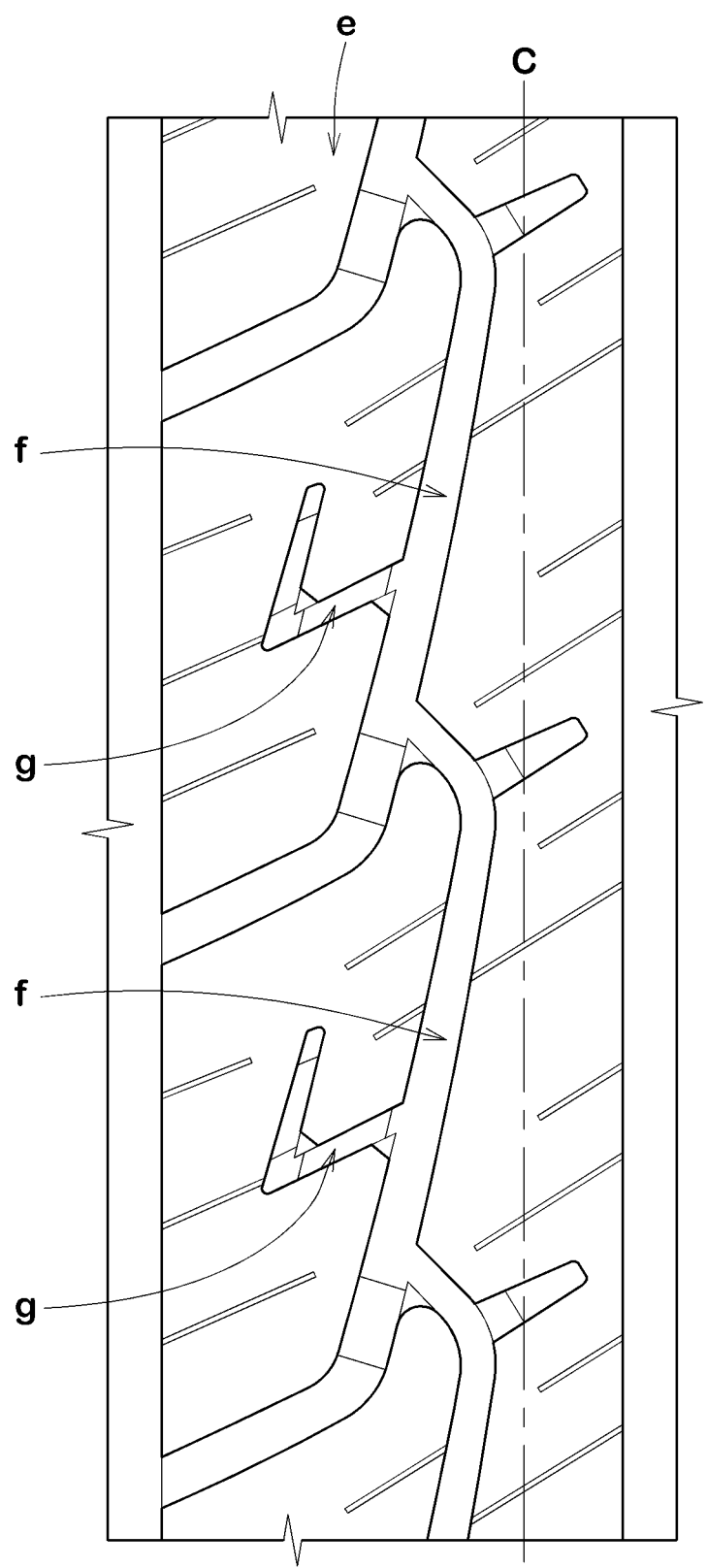
FIG. 13 shows a partial top view of a second middle land region of Reference example 1.

| Tire | Ref. 2 | Ex. 27 | Ex. 28 | Ex. 29 | Ex. 30 | Ex. 31 | Ex. 32 | Ex. 33 |
|---|---|---|---|---|---|---|---|---|
| first middle land region | FIG. 13 | FIG. 2 | FIG. 2 | FIG. 2 | FIG. 2 | FIG. 2 | FIG. 2 | FIG. 2 |
| total axial length L7 of axial groove segment and second inner auxiliary groove/axial width W1 of first middle land region | — | 0.63 | 0.55 | 0.60 | 0.70 | 0.75 | 0.63 | 0.63 |
| angle θ5 between second inner auxiliary groove and bend groove (deg.) | — | 40 | 40 | 40 | 40 | 40 | 25 | 35 |
| angle θ7 between axial groove segment and second portion of bend groove (deg.) | — | 128 | 128 | 128 | 128 | 128 | 128 | 128 |
| snow performance | 100 | 110 | 103 | 105 | 108 | 109 | 103 | 105 |
| steering stability | 100 | 100 | 100 | 100 | 99 | 95 | 99 | 99 |

TABLE 5

| Tire | Ex. 34 | Ex. 35 | Ex. 36 | Ex. 37 | Ex. 38 | Ex. 39 |
|---|---|---|---|---|---|---|
| first middle land region | FIG. 2 | FIG. 2 | FIG. 2 | FIG. 2 | FIG. 2 | FIG. 2 |
| total axial length L7 of axial groove segment and second inner auxiliary groove/axial width W1 of first middle land region | 0.63 | 0.63 | 0.63 | 0.63 | 0.63 | 0.63 |
| angle θ5 between second inner auxiliary groove and bend groove (deg.) | 45 | 55 | 40 | 40 | 40 | 40 |
| angle θ7 between axial groove segment and second portion of bend groove (deg.) | 128 | 128 | 115 | 120 | 140 | 145 |
| snow performance | 107 | 107 | 107 | 108 | 103 | 103 |
| steering stability | 100 | 100 | 100 | 100 | 98 | 98 |

From the test results, it was confirmed that the tires of Examples 27-39 demonstrated excellent snow performance while maintaining steering stability.

Based on the tread pattern shown in FIG. 1, pneumatic tires of size 215/60R16 (rim size 16×6.5) were experimentally manufactured as working examples Ex.40 to Ex.48. Further, a reference example Ref.3 having a first middle land region (h) shown in FIG. 14 was experimentally manufactured. The first middle land region (h) was provided with sipes (i) extending from the bend grooves to the crown circumferential groove, but inner disconnected sipes were not provided.

The reference example Ref.3 had the substantially same pattern as FIG. 1 except for the above.

Each test tire was tested for snow performance and steering stability.

The test results are indicated in Table 6 by an index based on Ref.3 being 100.

TABLE 6

Figure 14:
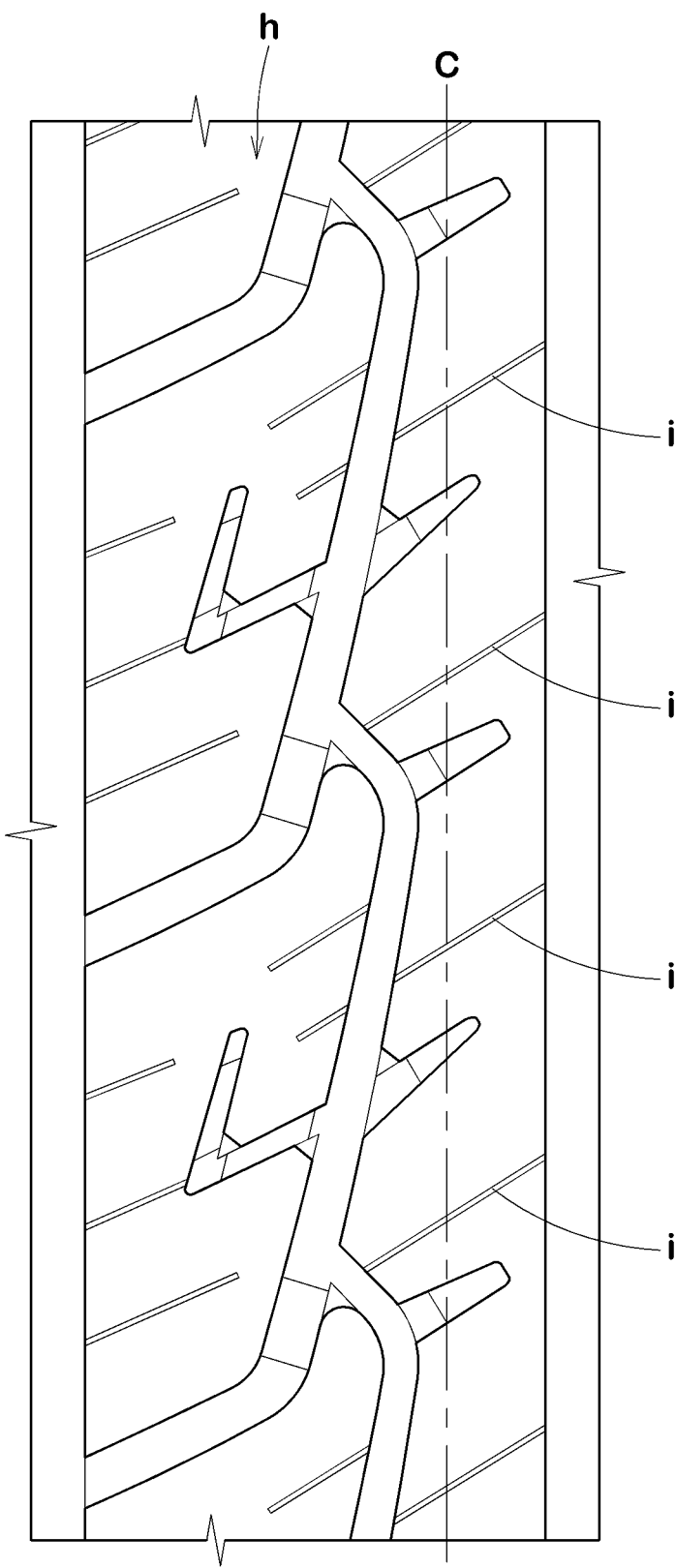
FIG. 14 shows a partial top view of a third middle land region of Reference example 1.

| Tire | Ref. 3 | Ex. 40 | Ex. 41 | Ex. 42 | Ex. 43 | Ex. 44 | Ex. 45 | Ex. 46 | Ex. 47 | Ex. 48 |
|---|---|---|---|---|---|---|---|---|---|---|
| first middle land region | FIG. 14 | FIG. 2 | FIG. 2 | FIG. 2 | FIG. 2 | FIG. 2 | FIG. 2 | FIG. 2 | FIG. 2 | FIG. 2 |
| length of first inner disconnected sipe/width W1 of first middle land region | — | 0.18 | 0.10 | 0.15 | 0.20 | 0.23 | 0.18 | 0.18 | 0.18 | 0.18 |
| length of second inner disconnected sipe/width W1 of first middle land region | — | 0.32 | 0.25 | 0.30 | 0.34 | 0.36 | 0.32 | 0.32 | 0.32 | 0.32 |
| first inner disconnected sipe angle (deg.) | — | 32 | 32 | 32 | 32 | 32 | 25 | 30 | 40 | 45 |
| snow performance | 100 | 103 | 101 | 103 | 103 | 104 | 104 | 103 | 102 | 102 |
| steering stability | 100 | 105 | 106 | 105 | 105 | 103 | 103 | 105 | 105 | 105 |

From the test results, it was confirmed that the tires of Examples 40-48 demonstrated excellent snow performance while maintaining steering stability.

DESCRIPTION OF THE REFERENCE SIGNS 2 tread portion
5 first shoulder circumferential groove
11 first middle land region
15 bend groove
15a first end
15b second end
16 first bent portion
17 second bent portion
Te1 first tread edge
θ1 angle
θ2 angle

The invention claimed is:

1. A tire comprising a tread portion having a first tread edge and a second tread edge, wherein
the tread portion is provided with a plurality of circumferential grooves disposed between the first tread edge and the second tread edge and extending continuously in the tire circumferential direction to axially divided the tread portion into a plurality of land regions, wherein
the circumferential grooves include
a first shoulder circumferential groove positioned on the most first tread edge side among the circumferential grooves, and
a crown circumferential groove positioned adjacently to the first shoulder circumferential groove on the second tread edge side thereof,
the land regions include a first middle land region defined between the first shoulder circumferential groove and the crown circumferential groove,
the first middle land region is provided with a plurality of bend grooves each having a first end and a second end,
each of the first ends of the bend grooves is connected to the first shoulder circumferential groove,
each of the second ends of the bend grooves is connected to one of the bend grooves which is next in one tire circumferential direction,
each of the bend grooves has a first bent portion on the first end side and a second bent portion on the second end side, at which the bend groove is bent, wherein
a bent angle θ1 at the first bent portion is greater than a bent angle θ2 at the second bent portion, and
the first middle land region is provided with a plurality of sipes which includes inner disconnected sipes extending from the crown circumferential groove and terminated within the first middle land region without being connected to the bend grooves to have terminal ends.

2. The tire according to claim 1, wherein
the bend grooves each comprise: a first portion extending from the first end to a bent point of the first bent portion; a second portion extending from the bent point of the first bent portion to a bent point of the second bent portion; and a third portion extending from the bent point of the second bent portion to the second end, and the second end is connected to the second portion of the next bend groove.

3. The tire according to claim 1, wherein
the plurality of land regions includes a first shoulder land region defined between the first shoulder circumferential groove and the first tread edge, and
the first shoulder land region is provided with a plurality of first shoulder lateral grooves each having a connected part with the first shoulder circumferential groove, and
extensions of the connected parts of the first shoulder lateral grooves which are extended toward the tire equator in parallel to the tire axial direction, overlap with the first ends of the bend grooves.

4. The tire according to claim 1, wherein
the first middle land region is provided with a plurality of auxiliary grooves including inner auxiliary grooves extending from the bend grooves toward the crown circumferential groove and terminated within the first middle land region to have terminal ends.

5. The tire according to claim 4, wherein
the inner auxiliary grooves include first inner auxiliary grooves and second inner auxiliary grooves, and
the terminal ends of the second inner auxiliary grooves are positioned on the first shoulder circumferential groove side of the terminal ends of the first inner auxiliary groove.

6. The tire according to claim 5, wherein
the first inner auxiliary grooves and the second inner auxiliary grooves are inclined in the same direction with respect to the tire axial direction, and
the inclination angle of the second inner auxiliary grooves with respect to the tire axial direction is greater than the inclination angle of the first inner auxiliary grooves with respect to the tire axial direction.

7. The tire according to claim 1, wherein
the first middle land region is provided with a plurality of auxiliary grooves including
inner auxiliary grooves extending from the bend grooves toward the crown circumferential groove and terminated within the first middle land region to have terminal ends, and
outer auxiliary grooves extending from the bend grooves toward the first shoulder circumferential groove and terminated within the first middle land region to have terminal ends, and ends of the outer auxiliary grooves at the bend grooves are, through the bend grooves, opposed in the tire axial direction to ends of the inner auxiliary grooves at the bend grooves.

8. The tire according to claim 7, wherein
each of the outer auxiliary grooves comprises
an axial groove segment extending in the tire axial direction from one of the bend grooves, and a circumferential groove segment extending in the tire circumferential direction from the axial groove segment.

9. The tire according to claim 7, wherein
the inner auxiliary grooves include first inner auxiliary grooves and second inner auxiliary grooves, and the terminal ends of the second inner auxiliary grooves are positioned on the first shoulder circumferential groove side of the terminal ends of the first inner auxiliary groove, and
the ends of the outer auxiliary grooves at the bend grooves are, through the bend grooves, opposed in the tire axial direction to ends of the second inner auxiliary grooves at the bend grooves.

10. The tire according to claim 1, wherein
the first middle land region is disposed across the tire equator,
the inner disconnected sipes include first inner disconnected sipes and second inner disconnected sipes, and
the terminal ends of the second inner disconnected sipes are positioned on the bend grooves' side of the terminal ends of the first inner disconnected sipes,
the first inner disconnected sipes are terminated on the crown circumferential groove side of the tire equator, and
the second inner disconnected sipes extend across the tire equator.

11. A tire comprising a tread portion having a first tread edge and a second tread edge,
the tread portion is provided with a plurality of circumferential grooves disposed between the first tread edge and the second tread edge and extending continuously in the tire circumferential direction to axially divided the tread portion into a plurality of land regions, wherein
the circumferential grooves include
a first shoulder circumferential groove positioned on the most first tread edge side among the circumferential grooves, and
a crown circumferential groove positioned adjacently to the first shoulder circumferential groove on the second tread edge side thereof,
the land regions include a first middle land region defined between the first shoulder circumferential groove and the crown circumferential groove,
the first middle land region is provided with a plurality of bend grooves each having a first end and a second end, and a plurality of auxiliary grooves,
each of the first ends of the bend grooves is connected to the first shoulder circumferential groove,
the second ends of the bend grooves are respectively connected to the respective next bend grooves in the tire circumferential direction, and
the auxiliary grooves include inner auxiliary grooves extending from the bend grooves toward the crown circumferential groove and terminated within the first middle land region to have terminal ends.

12. The tire according to claim 11, wherein the groove widths of the inner auxiliary grooves are gradually decreased toward the crown circumferential groove.

13. The tire according to claim 11, wherein
the inner auxiliary grooves include first inner auxiliary grooves and second inner auxiliary grooves, and
the terminal ends of the second inner auxiliary grooves are positioned on the first shoulder circumferential groove side of the terminal ends of the first inner auxiliary groove.

14. The tire according to claim 13, wherein
the first inner auxiliary grooves and the second inner auxiliary grooves are inclined in the same direction with respect to the tire axial direction, and
the inclination angle of the second inner auxiliary grooves with respect to the tire axial direction is greater than the inclination angle of the first inner auxiliary grooves with respect to the tire axial direction.

15. The tire according to claim 13, wherein
each of the bend grooves has a first bent portion on the first end side and a second bent portion on the second end side, at which the bend groove is bent, and
one of the first inner auxiliary grooves is connected to the second bent portion.

16. The tire according to claim 13, wherein
the auxiliary grooves include outer auxiliary grooves extending from the bend-grooves toward the first shoulder circumferential groove and terminated within the first middle land region, and
ends of the outer auxiliary grooves at the bend grooves are, through the bend grooves, opposed in the tire axial direction to ends of the second inner auxiliary grooves at the bend grooves.

17. A tire comprising a tread portion having a first tread edge and a second tread edge,
the tread portion is provided with a plurality of circumferential grooves disposed between the first tread edge and the second tread edge and extending continuously in the tire circumferential direction to axially divided the tread portion into a plurality of land regions, wherein
the circumferential grooves include
a first shoulder circumferential groove positioned on the most first tread edge side among the circumferential grooves, and
a crown circumferential groove positioned adjacently to the first shoulder circumferential groove on the second tread edge side thereof,
the land regions include a first middle land region defined between the first shoulder circumferential groove and the crown circumferential groove,
the first middle land region is provided with a plurality of bend grooves each having a first end and a second end, and a plurality of auxiliary grooves,
each of the first ends of the bend grooves is connected to the first shoulder circumferential groove,
the second ends of the bend grooves are respectively connected to the respective next bend grooves in the tire circumferential direction, and
the auxiliary grooves include
inner auxiliary grooves extending from the bend grooves toward the crown circumferential groove and terminated within the first middle land region to have terminal ends, and
outer auxiliary grooves extending from the bend grooves toward the first shoulder circumferential groove and terminated within the first middle land region to have terminal ends,
wherein ends of the outer auxiliary grooves at the bend grooves are, through the bend grooves, opposed in the tire axial direction to ends of the inner auxiliary grooves at the bend grooves.

18. The tire according to claim 17, wherein each of the outer auxiliary grooves comprises
- an axial groove segment extending in the tire axial direction from one of the bend grooves, and
- a circumferential groove segment extending in the tire circumferential direction from the axial groove segment.

19. The tire according to claim 18, wherein the length in the tire axial direction of the axial groove segment is greater than the length in the tire axial direction of the inner auxiliary grooves.

* * * * *